May 30, 1939. V. W. KLIESRATH 2,160,271
AUTOMOBILE
Original Filed Jan. 14, 1933   14 Sheets-Sheet 4
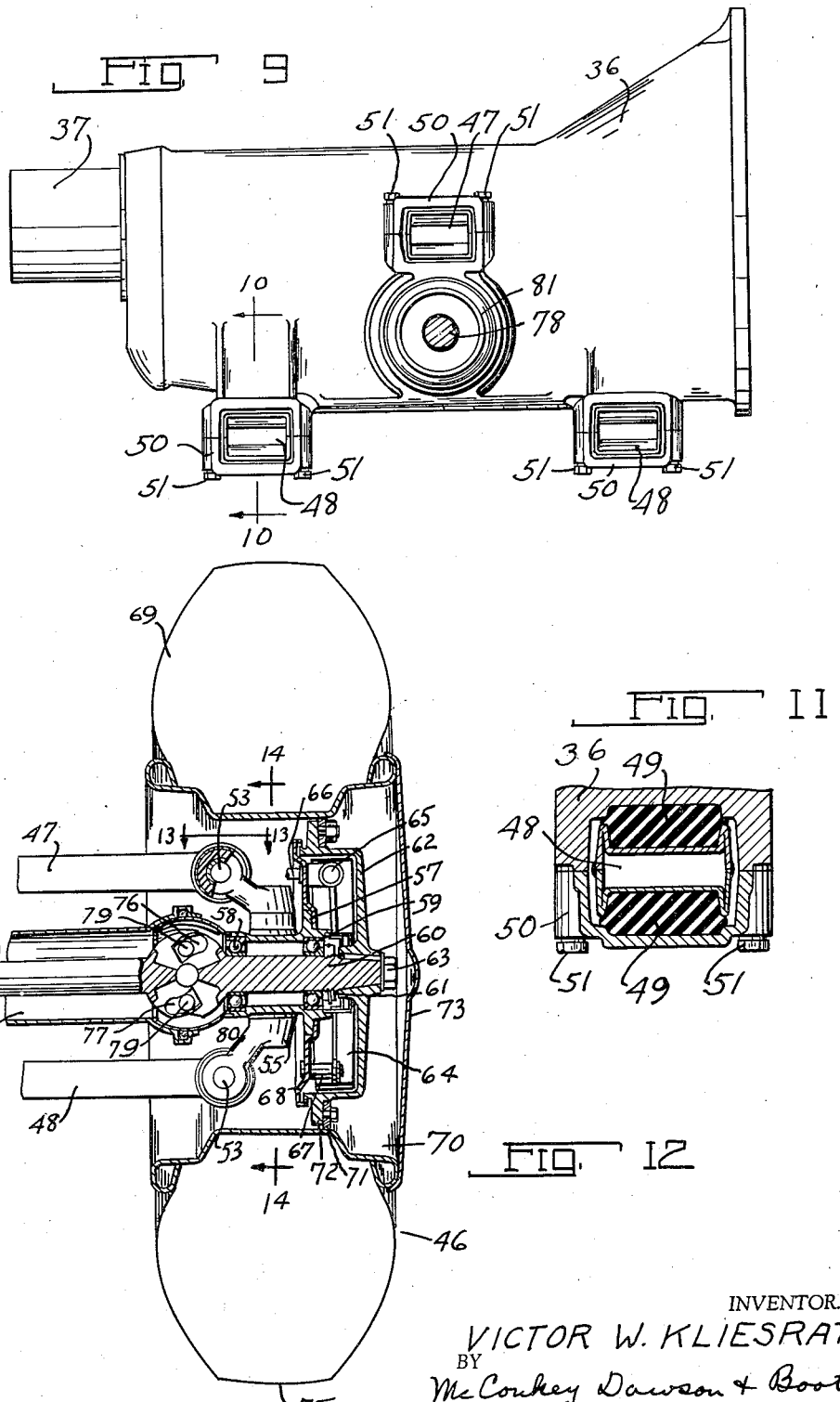
INVENTOR.
VICTOR W. KLIESRATH
BY
McConkey Dawson & Booth
ATTORNEYS.

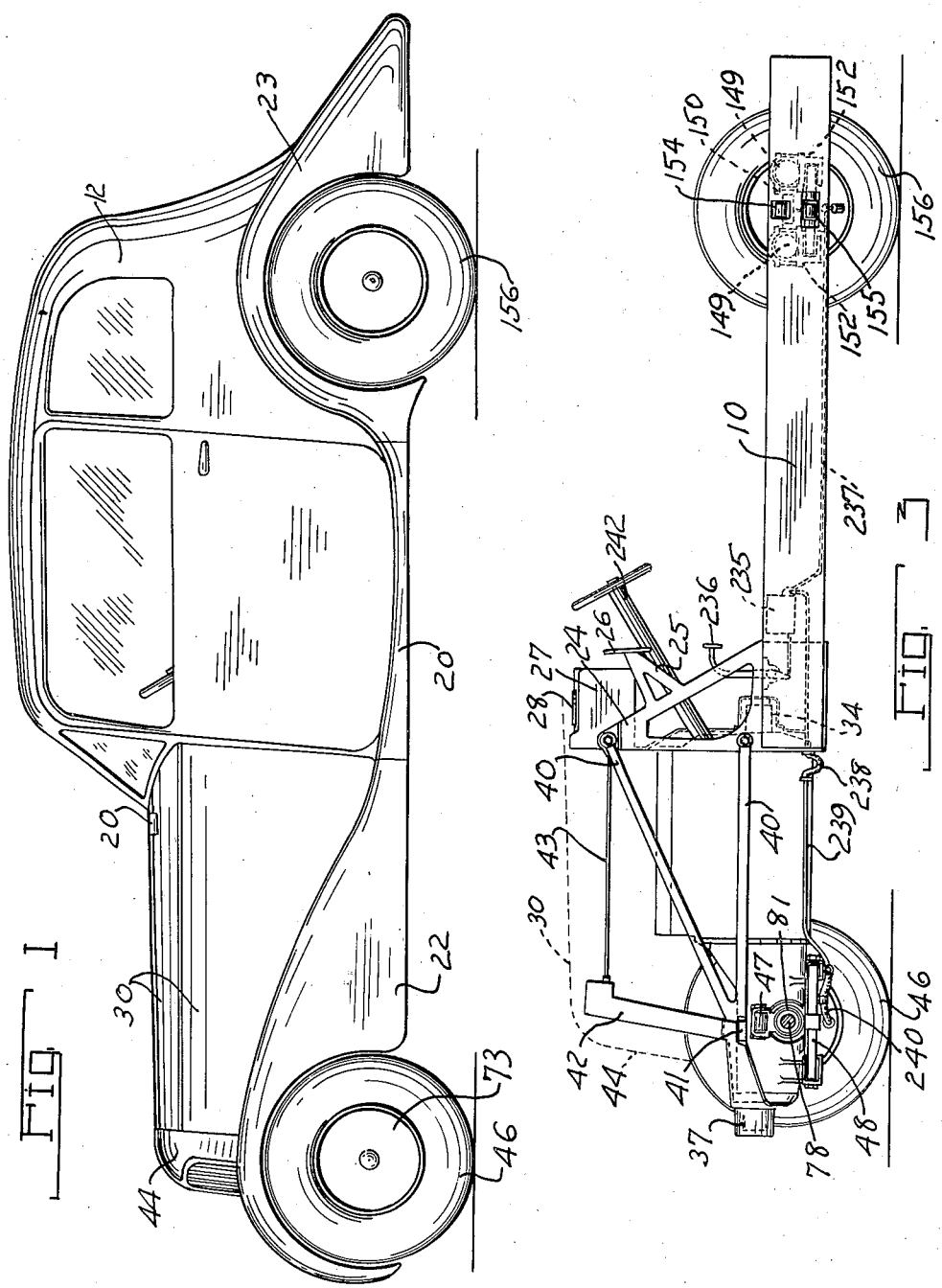

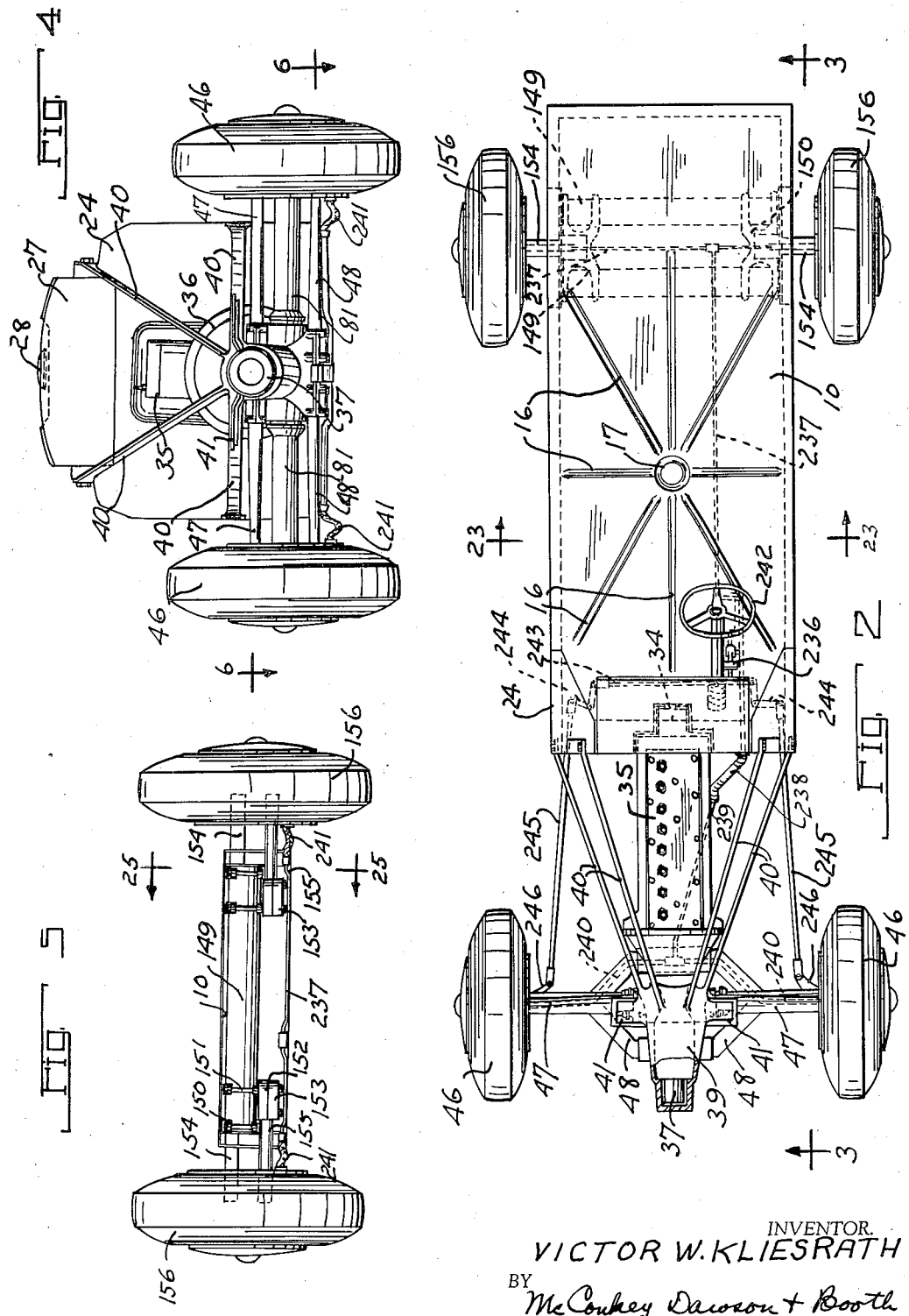

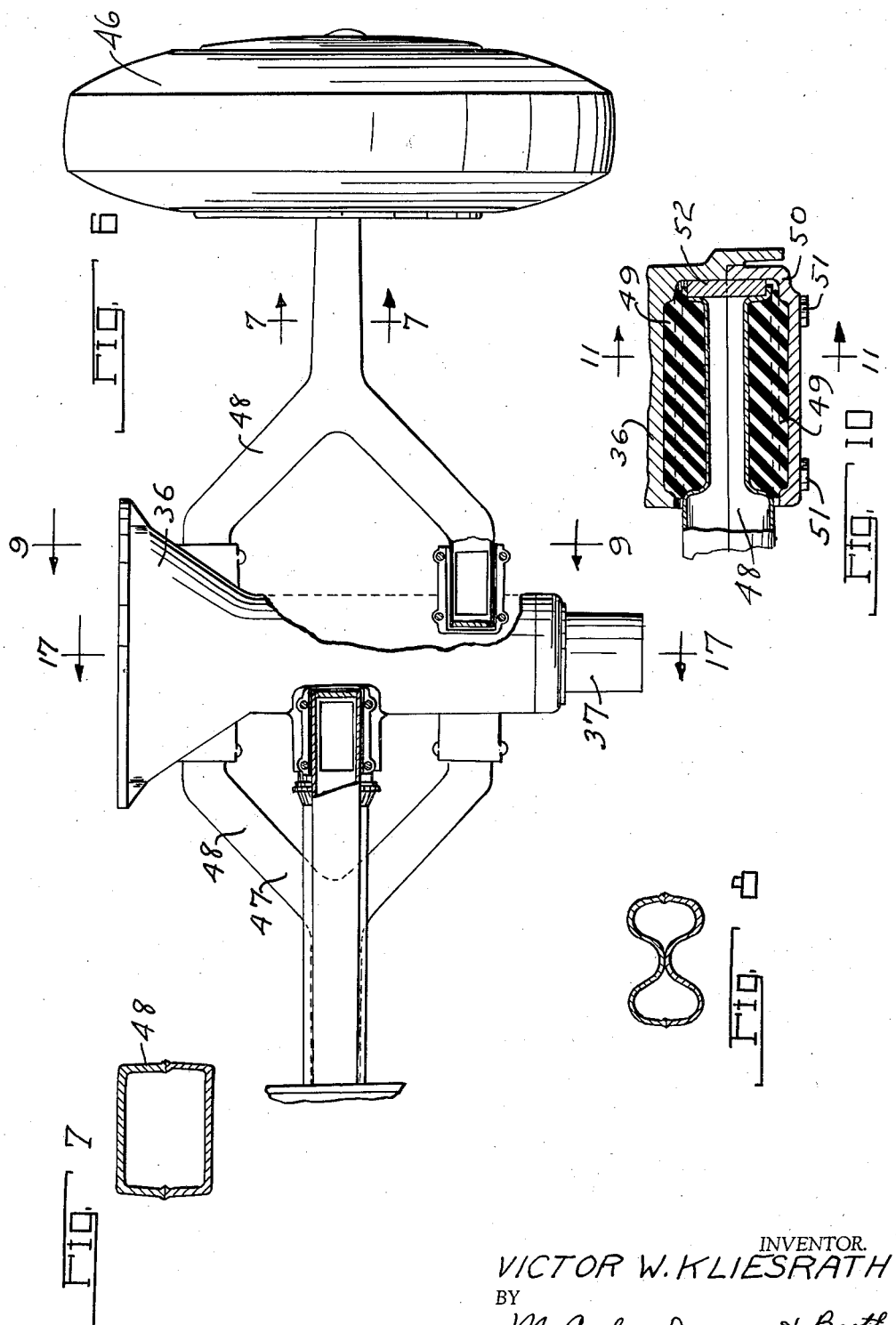

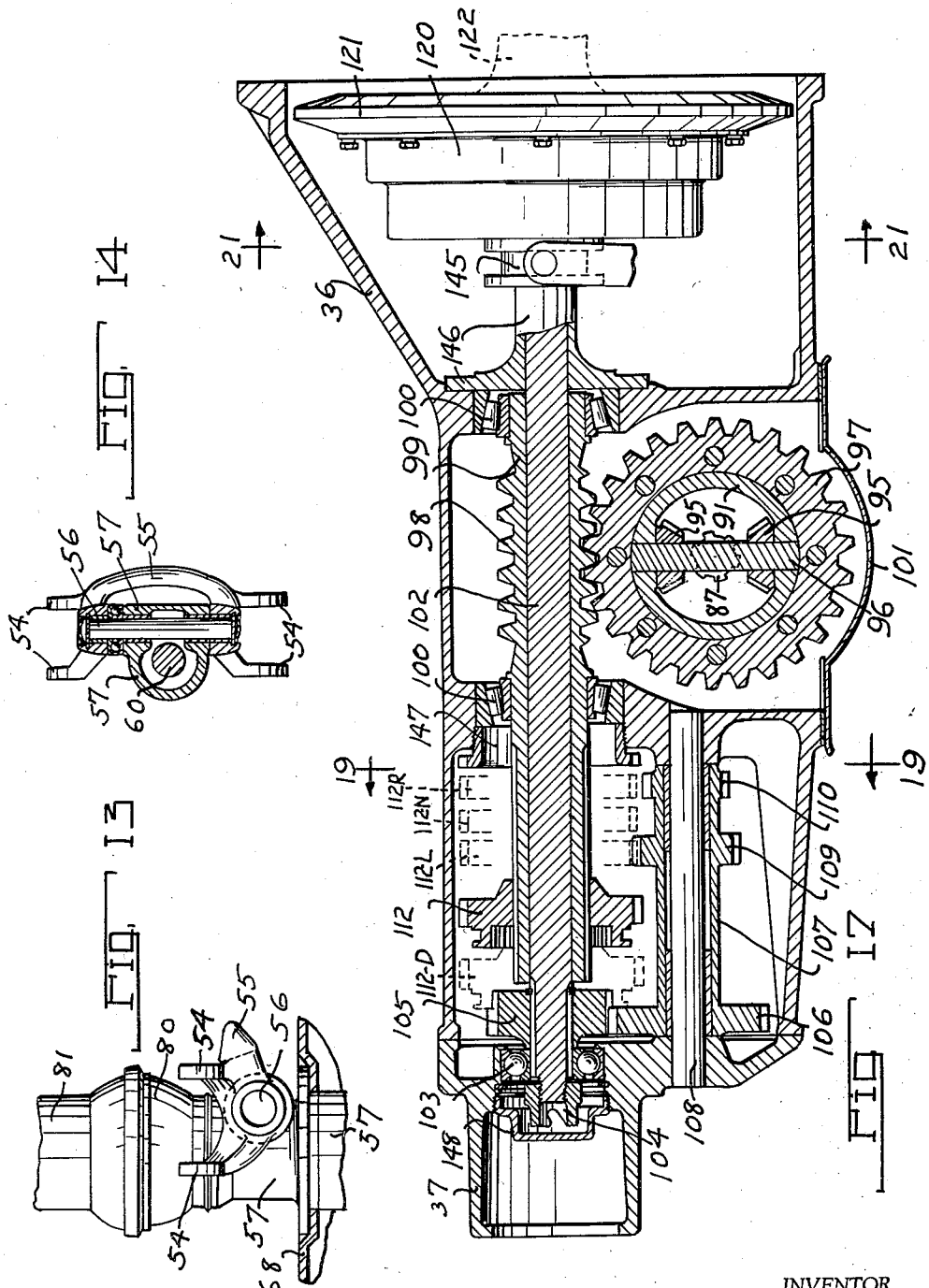

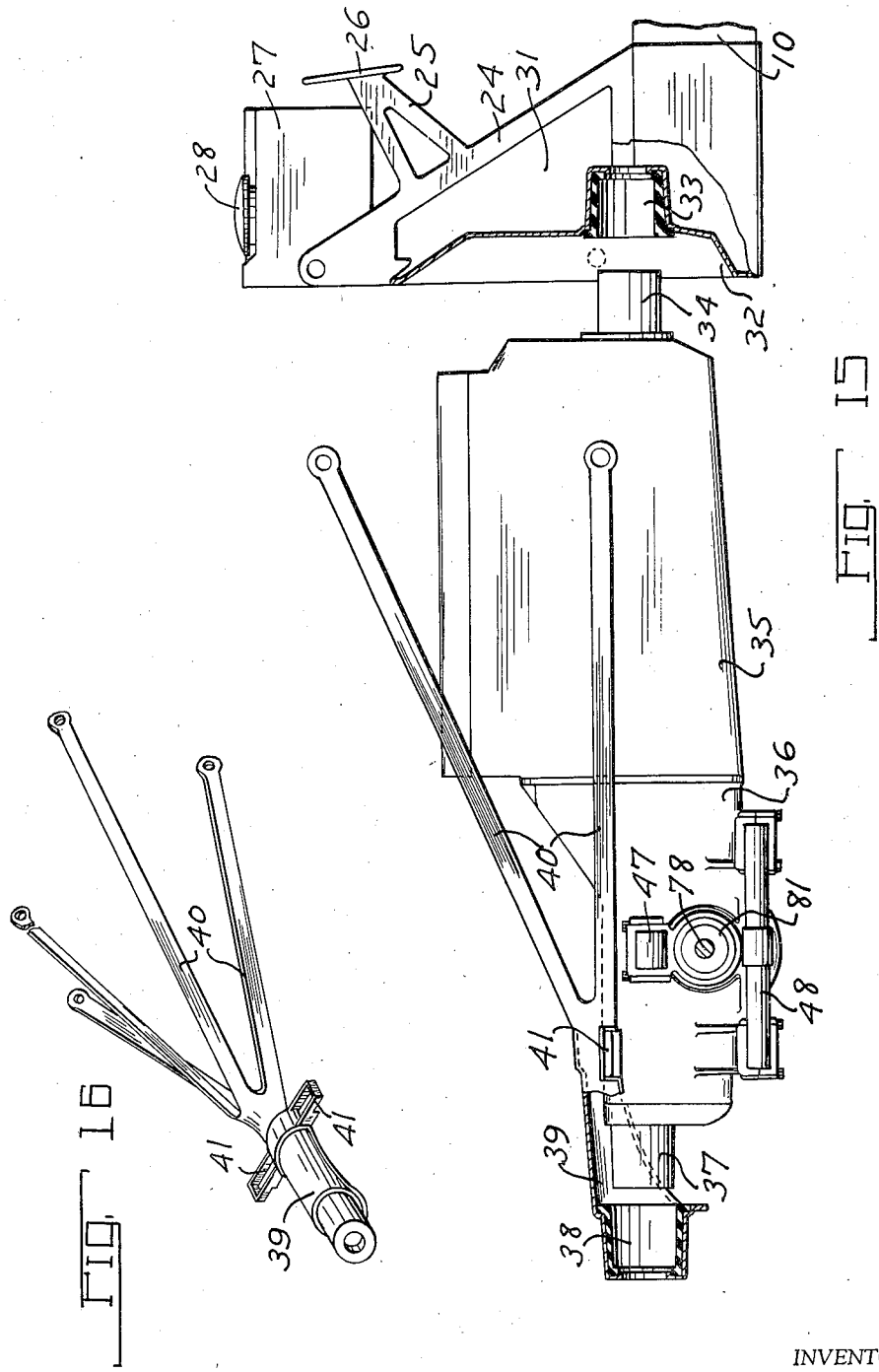

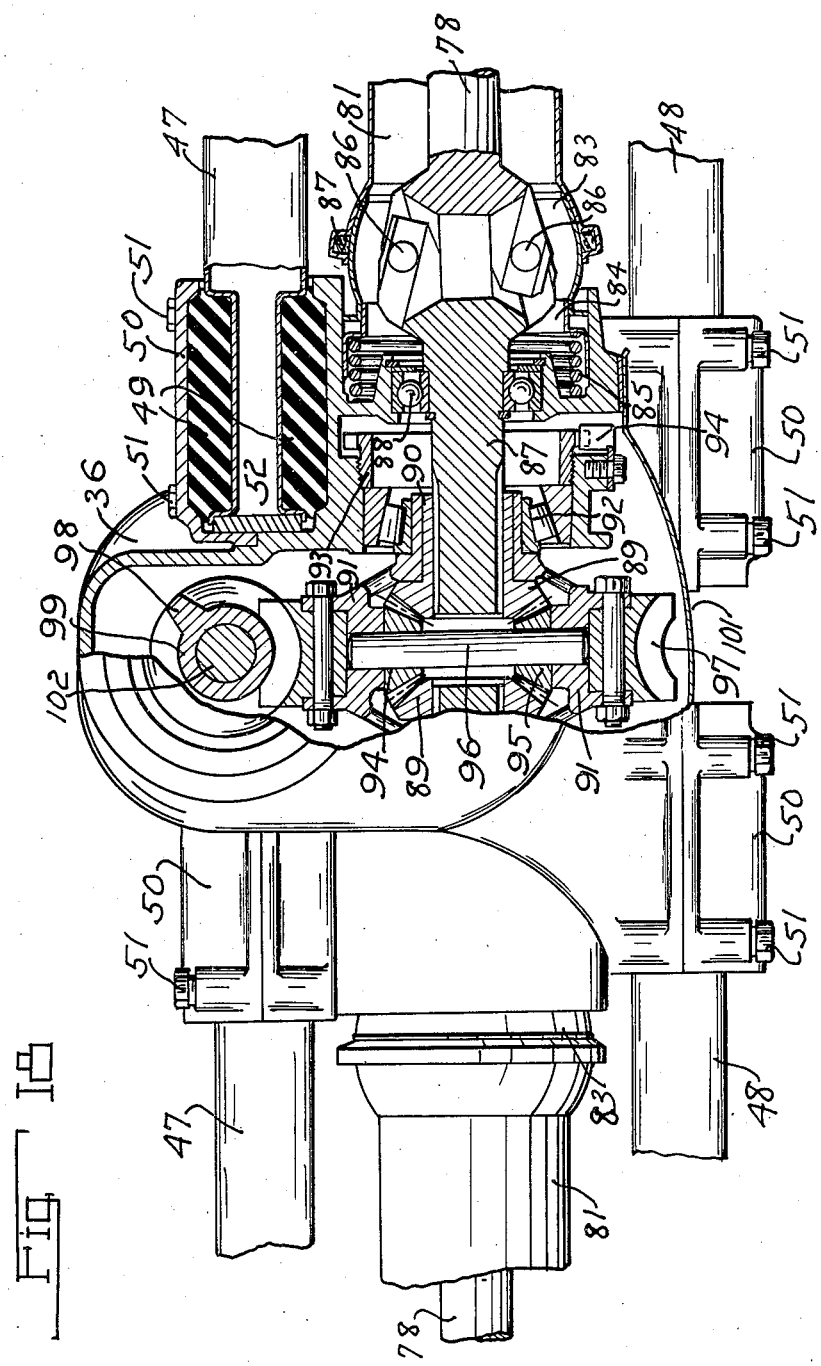

May 30, 1939. V. W. KLIESRATH 2,160,271

AUTOMOBILE

Original Filed Jan. 14, 1933 14 Sheets-Sheet 8

INVENTOR.
VICTOR W. KLIESRATH
BY
McConkey Dawson & Booth
ATTORNEYS.

May 30, 1939.  V. W. KLIESRATH  2,160,271
AUTOMOBILE
Original Filed Jan. 14, 1933  14 Sheets-Sheet 9
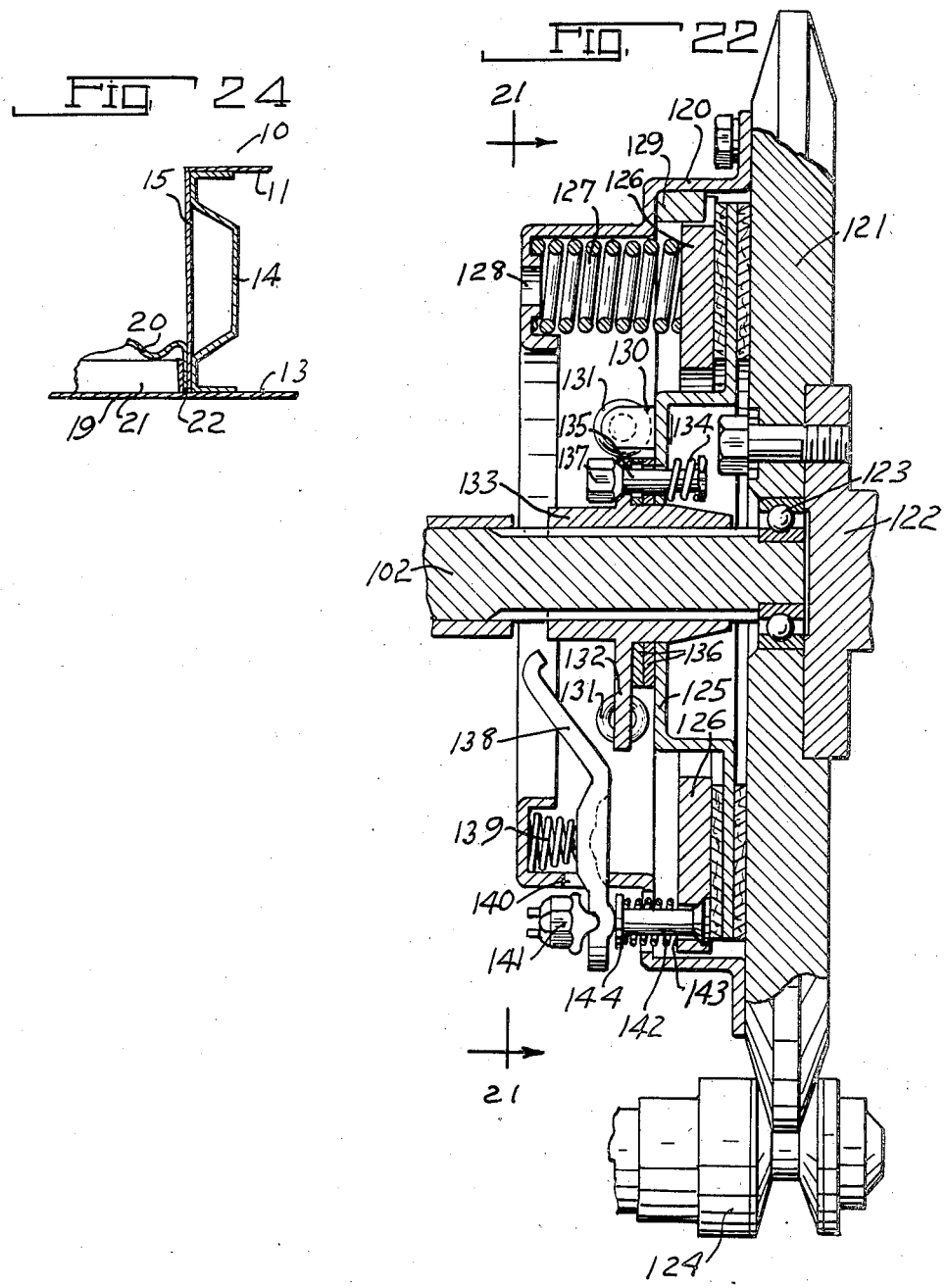
INVENTOR.
VICTOR W. KLIESRATH
BY McConkey Dawson & Booth
ATTORNEYS.

May 30, 1939.  v. W. KLIESRATH  2,160,271
AUTOMOBILE
Original Filed Jan. 14, 1933   14 Sheets-Sheet 10
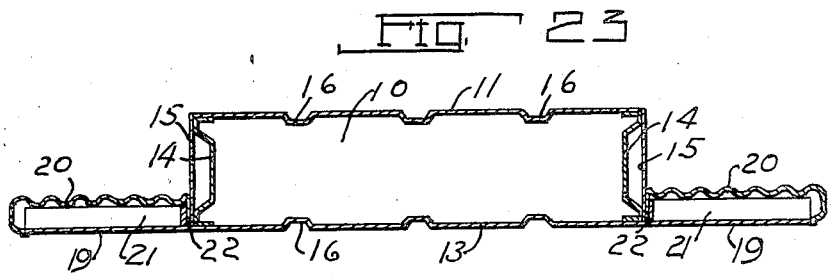
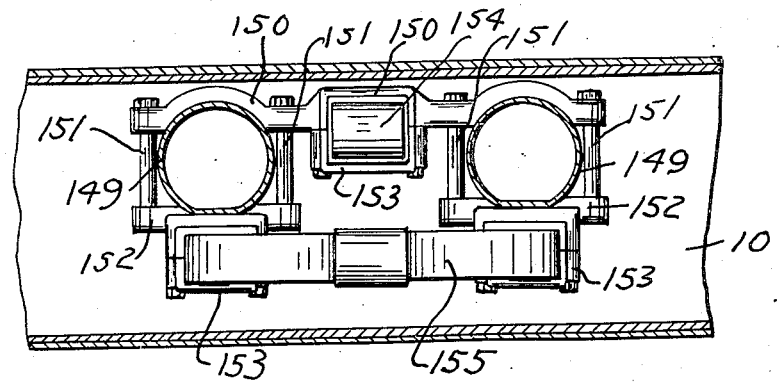
INVENTOR.
VICTOR W. KLIESRATH
BY McConkey Dawson & Booth
ATTORNEYS.

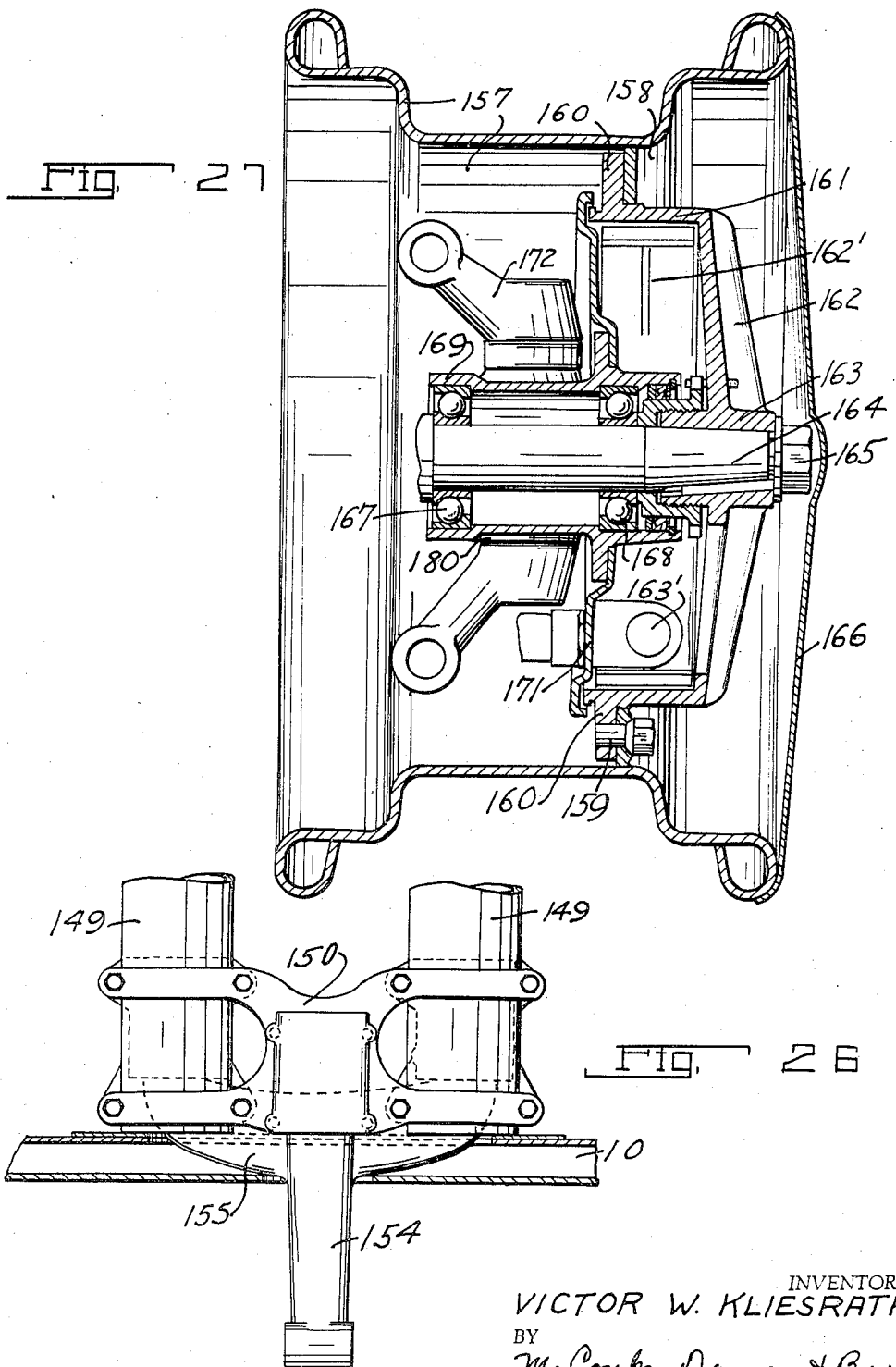

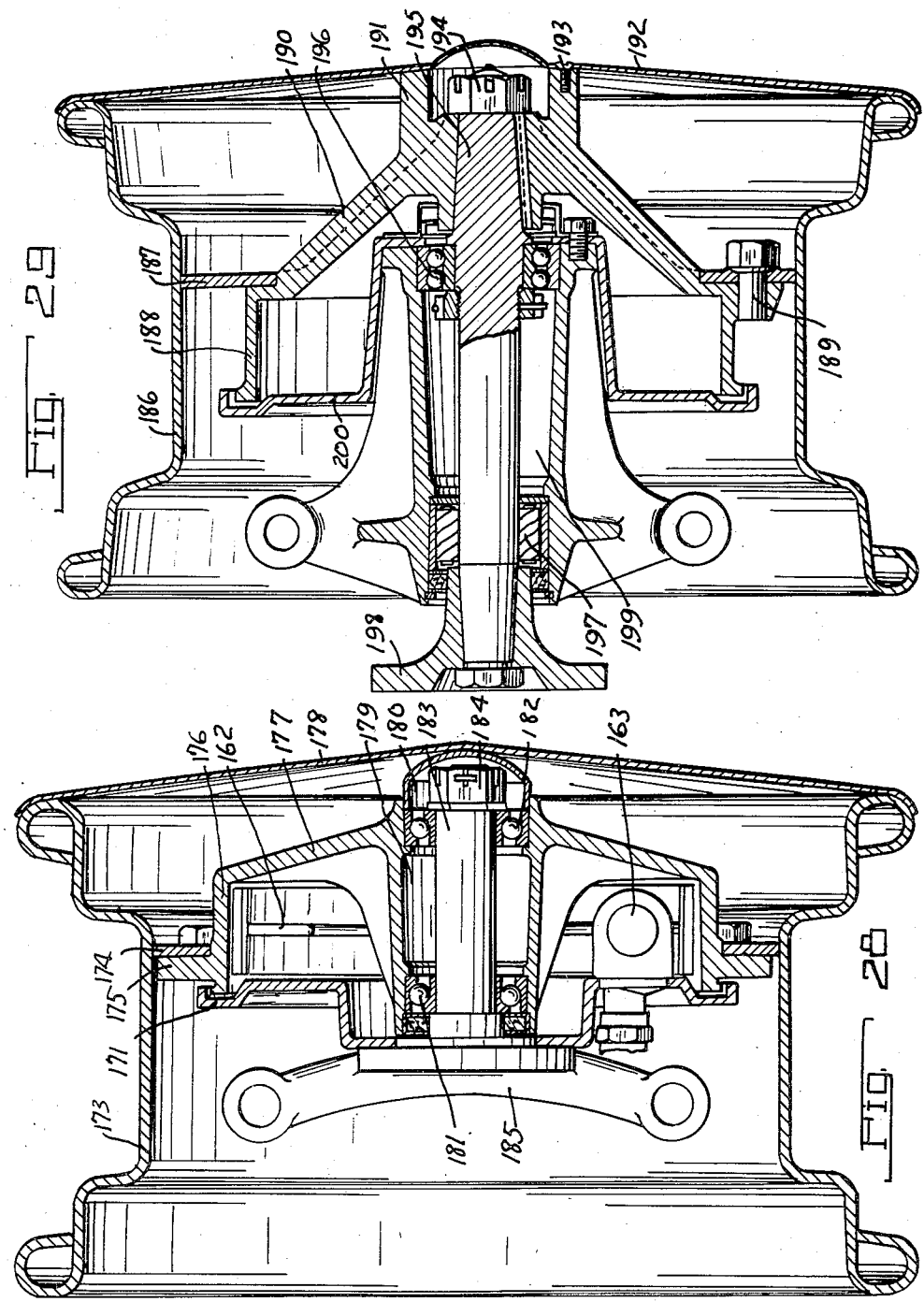

May 30, 1939.　　　V. W. KLIESRATH　　　2,160,271
AUTOMOBILE
Original Filed Jan. 14, 1933　　14 Sheets-Sheet 13
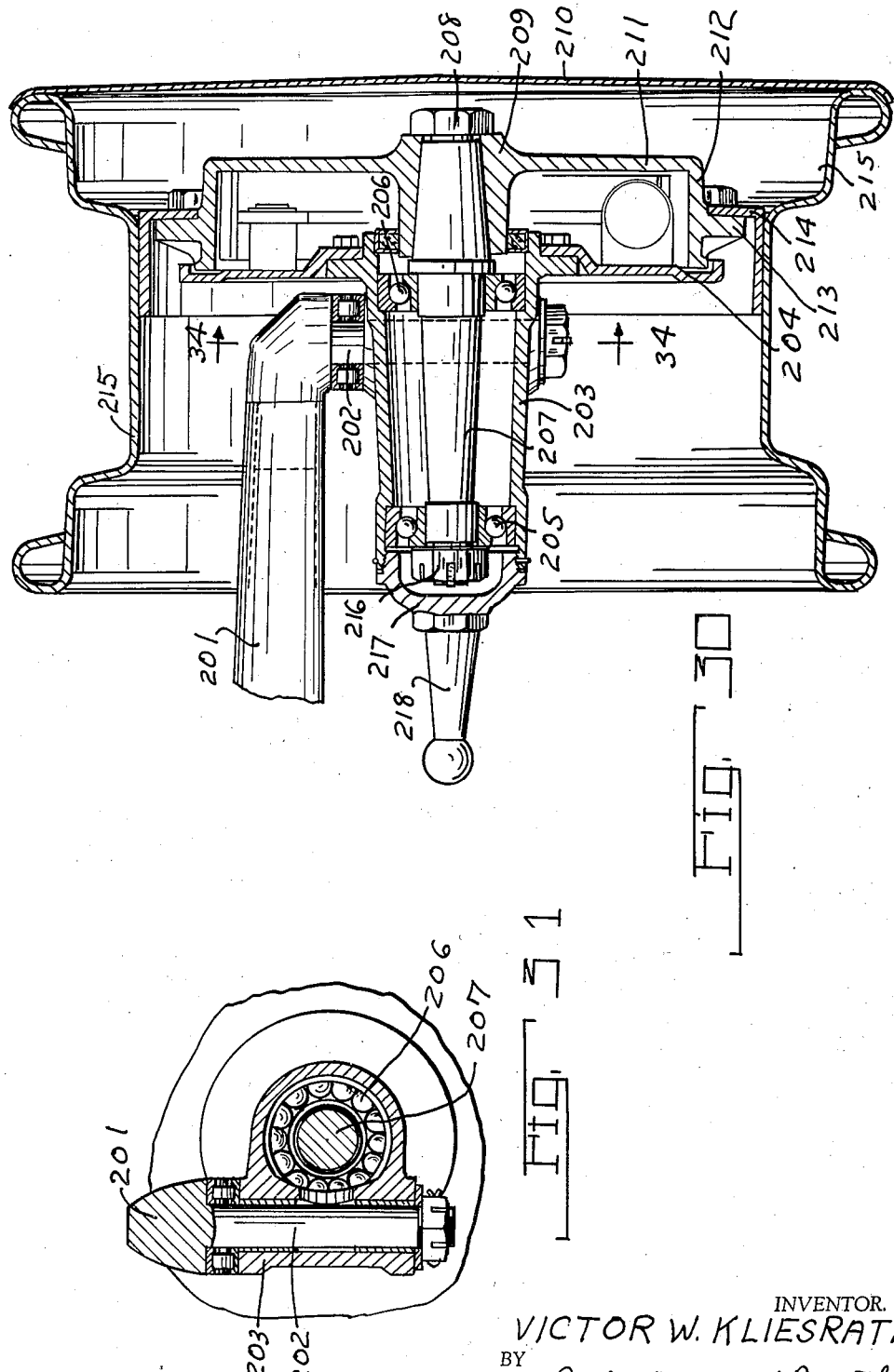
INVENTOR.
VICTOR W. KLIESRATH
BY
McConkey Dawson & Booth
ATTORNEYS.

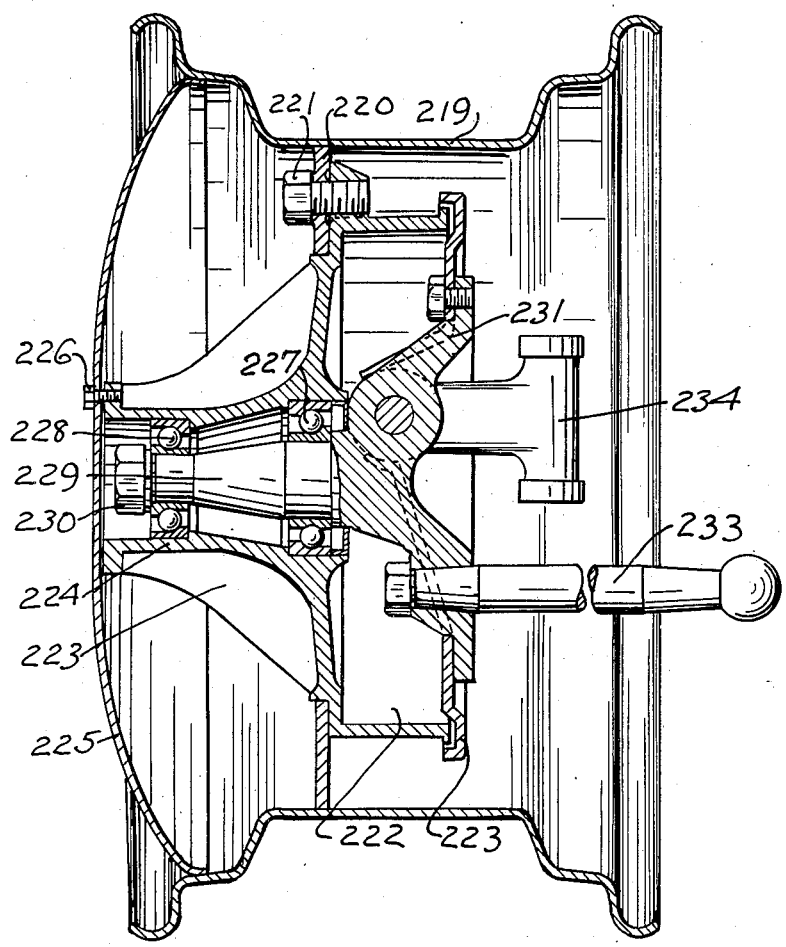

Patented May 30, 1939

2,160,271

UNITED STATES PATENT OFFICE 2,160,271

AUTOMOBILE

Victor W. Kliesrath, South Bend, Ind., assignor, by mesne assignments, to International Engineering Corporation, Chicago, Ill., a corporation of Illinois Original application January 14, 1933, Serial No. 651,821. Divided and this application January 22, 1938, Serial No. 186,290

50 Claims. (Cl. 180—1)

This invention relates to automobiles and other motor vehicles, and is illustrated as embodied in an automobile having a novel arrangement of parts giving a very light weight and consequent high acceleration, and which is of simple and inexpensive construction and which is preferably of the front-wheel drive variety.

One feature of the invention relates to the construction of the vehicle in two sections, shown as being respectively a front section carrying the power plant and a rear section shown as being a sort of trailer unit which carries the body and which is attached in a novel manner to the front section. Since practically all the operating parts of the vehicle are on the front section, this permits a very simple and inexpensive method of assembling the complete car, with the operating parts fully assembled on the front unit which when complete is bolted or otherwise secured to the rear unit. I also prefer to take advantage of this construction to form the rear unit as practically a vehicle body on which the rear road wheels are mounted; that is, I eliminate the usual frame by mounting the rear wheels directly on the body and attaching the body to the above-described front unit wich carries the operating mechanism.

According to a very important feature of the invention, advantage is taken of the foregoing construction to provide in the front unit a frame or other engine support projecting forwardly from the vehicle dash, which forms the rear transverse element of the front unit and which is directly secured to the rear unit of the vehicle, and to pivotally support the power plant or engine-transmission unit therein.

This greatly facilitates an arrangement which I believe to be entirely new, in this or any other type of motor vehicle, in which the pivotally mounted power unit is provided with axle sections or the like which directly carry the road wheels. By this novel arrangement it will be seen that the reaction torque of the engine is not transmitted to the body but is transmitted directly to the road wheels through the axle sections which engage the pivotally mounted power unit. This secures a highly desirable result, which has been approximated by various yielding mountings of the power units in the chassis frame but which has never before been completely achieved, in entirely eliminating the engine reaction impulses from any possibility of being transmitted to the vehicle body.

With the described arrangement, therefore, so far as passengers in the vehicle body are concerned, even an engine with a relatively small number of cylinders does not produce any reactionary vibrations and gives the effect of being as smooth as an electric motor or the like. At the same time the vehicle body is provided with what in effect is a three-point suspension, since it is supported on the pivotal mounting of the power unit at its front end and on the rear road wheels at its rear end. The described arrangement therefore has the additional advantage of entirely eliminating any twisting or weaving of the vehicle body.

In reducing to a practical embodiment the above described broad conception, I have provided numerous novel subcombinations which contribute very materially to the success of the broad combination, and which also in themselves embody substantial novelty. Among the more important of these is a novel spring suspension giving individual springing of each of the four wheels, by the use of rigid axle sections which are yieldingly mounted at their inner ends in rubber blocks or equivalent yielding mountings. The yielding mountings are preferably arranged, as explained above, in sockets formed in the pivotally mounted power unit for the front wheels, and are shown mounted on the vehicle body for the rear wheels. Preferably the set of axle sections for each wheel includes at least one section which is Y-shaped in horizontal plan, so that it resists fore-and-aft movement of its wheel, and I prefer to form the axle sections by welding, or otherwise securing together face to face, channel-section steel stampings, thus giving a very strong hollow box-section.

While many of the advantages mentioned above could be secured with the usual rear-wheel drive, the advantages are greatly augmented by combining therewith in a novel manner a front-wheel drive, shown as including driving-axle shafts arranged between the above-described upper and lower axle sections and provided at their outer ends with universal joints and associated parts arranged in a novel manner and through which the wheels are driven. The driving shafts may advantageously be housed in an improved form of tubular sectional housing, and at their inner ends are universally jointed to shaft sections driven by a differential which is mounted in the power unit, preferably between the engine and a novel transmission which is shown as being of the progressive sliding-gear type.

The power unit embodies substantial novelty in the arrangement and construction of the transmission and differential and in the construction and arrangement of the clutch, particularly in the arrangement of a clutch of the novel form hereinafter described between the front end of the engine crank shaft and the differential, and arranged to drive a forwardly-extending shaft which forms the driving shaft of the transmission and on which there is sleeved a hollow shaft provided with a worm or other gear for driving the differential. The transmission is thus arranged at the extreme forward end of the car and serves to connect at different speeds the front ends of the forwardly-extending clutch shaft and the differential-driving hollow shaft.

The above-mentioned dash or transverse supporting element of the front vehicle unit in itself embodies some features of novelty, particularly in being provided with a stamped or other resilient support for a bearing which pivotally carries the rear end of the power unit. As explained above, a novel form of pyramidal frame serving as an engine support is secured at its rear end or base to the transverse dash, and projects forwardly therefrom to carry the front engine support. The dash may also, if desired, carry the fuel tank which may be provided with a filler opening accessible through a cowl ventilator provided adjacent the engine hood.

The mounting for the rear wheels, while embodying many of the features of the front wheel mountings, has also some additional features of novelty in the mounting of the sockets for the axle sections on clamps or the like engaging a pair of transversely extending reinforcing elements, preferably of tubular construction, which span the rear portion of the base or lower part of the body. The wheel assemblies, both front and rear have also some features of novelty in the use of demountable outer plates or fairings which cooperate with the tires and the fenders to give a completely stream-lined effect for the entire lower portion of the vehicle, in a novel arrangement of spindle parts and associated bearings and the like which facilitate the use of the above-described arrangement of axle sections giving an individual springing of each axle, and in the wheel and brake drum and brake structure and arrangement and the like.

Another important advantage which is secured by the use of the above-discussed arrangement is that the usual chassis frame may be eliminated and in place thereof the body itself may be formed with a novel box-section reinforced base which is light but exceedingly strong and which has a flat bottom paralleling the ground at the level of the bottom of the rear axle in the ordinary car, so that the entire body is lowered very substantially and at the same time all projecting parts below the car are eliminated entirely and the bottom part of the car is in effect completely stream-lined. The use of a construction of this sort permits the use of an improved construction for mounting of the running boards and fenders and the like.

The entire design discussed above, when used as a coherent whole in one vehicle, gives a very light weight with consequent high acceleration and high road speeds, this effect being accentuated by the facility with which the assembly can be effectually stream-lined and by the elimination of most of the usual projecting parts which add to the wind resistance of the ordinary car. In connection with the very simple springing of the wheels by the use of the rigid parallel axle sections with their rubber seats, I prefer to use very small diameter wheels with very large tires of the type known as super-balloon tires, which not only add to the resilient effect of the spring suspension but which also flatten out substantially against the road and increase the tractive effect of the wheels. This adds to the degree of acceleration possible and to the effectiveness of the brakes in decelerating the car, and so far as these features of operation are concerned the flattening of the tires in this manner against the road may be regarded as providing an equivalent for the tractive effect produced by the weight of the usual heavier cars.

The above and other objects and features of the invention, including an improved steering gear arrangement and a novel arrangement of the hydraulic lines of a system of hydraulic four-wheel brakes, and other arrangements of parts and desirable particular constructions, will be apparent from the following description of the illustrative embodiment shown in the accompanying drawings, in which:

Figure 1 is a side elevation of a motor vehicle embodying my invention;

Figure 2 is a top plan view of the chassis of the vehicle shown in Figure 1, with the fenders and running board and body and the engine hood all removed;

Figure 3 is a longitudinal section through the chassis on the line 3—3 of Figure 2 and showing the main units of the chassis in side elevation;

Figure 4 is a front elevation of the chassis;

Figure 5 is a rear elevation of the chassis;

Figure 6 is a view partly in top plan and partly broken away on the line 6—6 of Figure 4, and showing the front supporting members or movable axles and their relation to the front wheels and to the transmission casing;

Figure 7 is a section through one of the movable supporting members or axles on the line 7—7 of Figure 6;

Figure 8 is a section corresponding to Figure 7 but showing a modified construction;

Figure 9 is a section on the line 9—9 of Figure 6, and showing the relation of the movably supported members or axles to the transmission housing;

Figure 10 is a partial section on the line 10—10 of Figure 9 and showing the compressed rubber mounting of one of the movable members or axles;

Figure 11 is a section through this same mounting on the line 11—11 of Figure 10;

Figure 12 is a vertical section through the left front wheel, looking toward the rear of the car, and showing portions of some of the associated supporting and driving parts;

Figure 13 is a partial section on the line 13—13 of Figure 12 and showing the arrangement of the wheel spindle;

Figure 14 is a partial section through the spindle mounting on the line 14—14 of Figure 12;

Figure 15 is a view showing the engine with the transmission housing attached, and with the mounting for the opposite ends of the power or engine-transmission unit shown adjacent the opposite ends thereof, but with the parts separated and partly broken away, the better to show their relationship;

Figure 16 is a perspective of the framework which supports the front end of the power or engine-transmission unit, and which in turn is supported from the transverse dash at the rear of the engine;

Figure 17 is a section through the transmission on the line 17—17 of Figure 6;

Figure 18 is a top plan view of the transmission shown in Figure 17, with its associated parts, partly broken away in a vertical plane passing through the axis of the live driving axle shafts which extend to and drive the front wheels;

Figure 22 is a section through the clutch on the line 22—22 of Figure 21;

Figure 23 is a section through the base portion of the body on the line 23—23 of Figure 2;

Figure 24 is a view on a larger scale of one side wall, and the adjacent portion of the running board, of the base shown in Figure 23;

Figure 25 is a section on the line 25—25 of Figure 5 and showing the rear axle construction in a plane just inside the side wall of the base of the body;

Figure 26 is a top plan view of the parts shown in Figure 25 but with the side wall of the base shown in section;

Figures 27, 28, 29, 30 and 32 are respectively vertical sections through alternative front wheel constructions; and Figure 31 is a partial vertical section through the wheel spindle of Figure 30.

Figure 21:
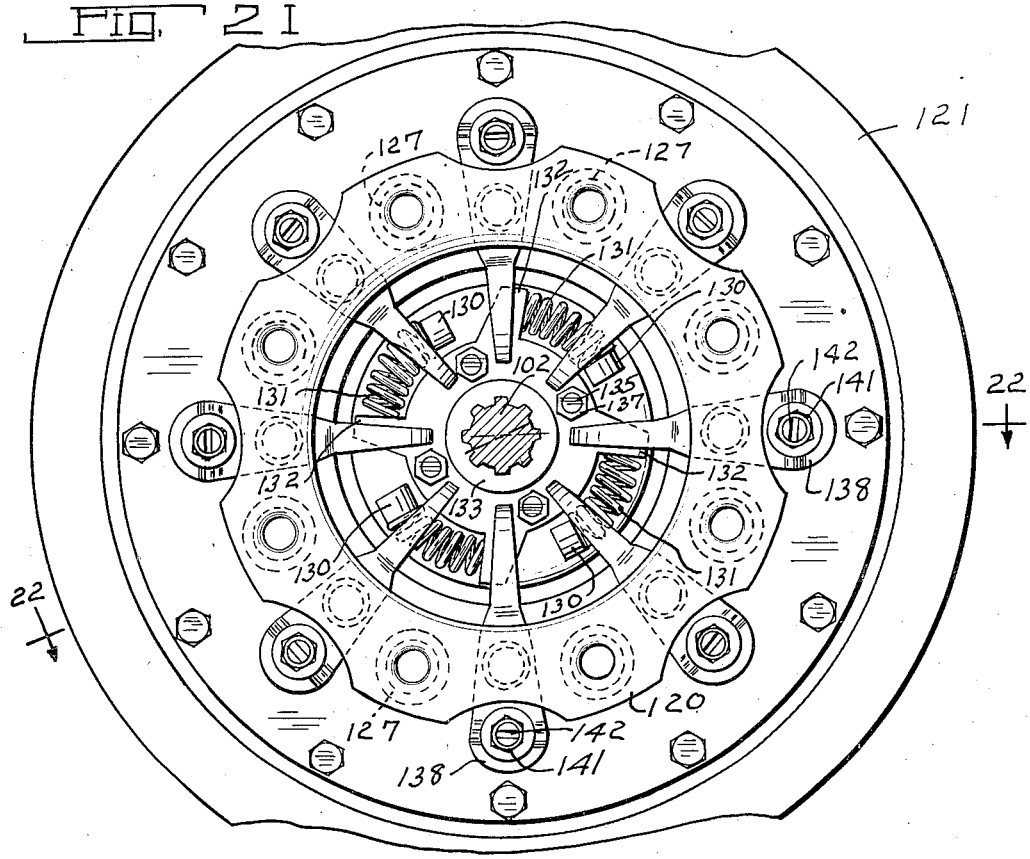
Figure 21 is a rear elevation of the clutch looking in the direction of the arrows 21—21 in Figure 17, and showing the driving portion of the engine crank shaft in transverse vertical section.
Figures 19, 20:
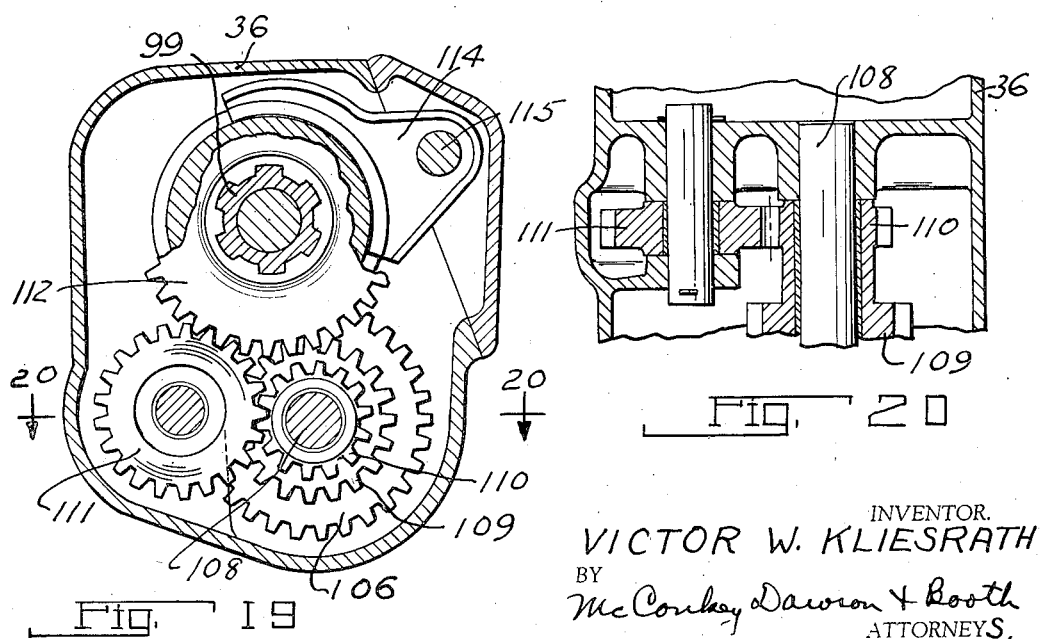
Figure 19 is a transverse vertical section through the transmission on the line 19—19 of Figure 17, and showing the reverse drive gearing.
Figure 20 is a partial section on the line 20—20 of Figure 19 and also showing part of the reverse drive gearing.

As explained above, the vehicle preferably includes a body or rear section or unit which may be mounted upon or formed with a light but strong base, shown as being of novel box-like section, and which is supported in a novel manner upon the rear road wheels, together with a front or driving section or unit which carries the engine and the mechanism through which the front wheels are driven by the engine. The two sections or units may be bolted or otherwise fastened together substantially in the transverse plane of the dash to form a complete chassis, or in fact (except for the engine hood or its equivalent) a complete vehicle. The relation of the front unit to the rear or body unit includes a number of novel phases, such as the above-discussed mounting of the engine which permits it to swivel freely with respect to the body and to transmit its torque directly to the front or driving wheels by a novel arrangement.

The wheels directly support the engine, for example, through novel movable axle sections which are shown seated in compressed rubber sockets or the like in the sides of the power unit, with the engine in turn supporting through its swivel mounting a framework which carries the load of the front end of the vehicle and which is attached to the front end of the body section or rear unit. It will be appreciated that many of the advantages of the invention can be secured without using all of the different novel structures described below, but the full avantages of the construction with its light weight and concurrent quick acceleration, its low body height without sacrifice of head room and without diminishing the usual road clearance, and the other advantages discussed above and pointed out below, can best be secured in a vehicle such as shown in the drawings and now to be particularly described as comprising the preferred embodiment, and which includes all of the various features of novelty in their intended combination and co-relation.

This particular illustrative embodiment includes a rear or body section or unit comprising a novel base 10 shown in detail in Figures 23 and 24. This base not only forms a part of the body proper 12, (Fig. 1) which is mounted on the base 10 in the form shown in Figures 23 and 24, but may also be regarded as a substitute for the usual chassis frame which I find it unnecessary to employ as a separate element of the vehicle.

The base 10 as shown in Figures 2 and 23 comprises upper and lower sheet metal stampings 11 and 13 welded or otherwise permanently secured to longitudinally extending side channel members 14 and straight members 15 jointly forming box-section side rails or supports. The upper and lower edges of the side members 14 and 15 are also preferably welded together by seam-welding or by a series of spot welds or the like.

In order to increase the resistance of the base to twisting, it may be made more rigid by providing it with a series of corrugations or reinforcing grooves 16 formed in the upper and lower members 11 and 13 and radiating from positions adjacent a central circular corrugation or groove 17. The six corrugations 16 which radiate toward the two ends of the body are preferably of the same length so that they may be formed successively with a single die if desired. In the arrangement of Figure 23 it is intended that the corrugations 16 in the upper member 11 will be filled in substantially flush by placing therein small strips of wood generally like building lath, so that the surface so formed may be covered by a carpet or mat and form the floor of the car body.

The running boards may be formed by providing the bottom member 13 with extensions 19 on opposite sides as shown in Figure 23 and to which are secured, by welding or otherwise, longitudinally corrugated stampings 20 which may if desired house the board or metal reinforcement 21. The running board proper 20 is preferably formed with a flange 22 seated against and welded or otherwise secured to the side member 15.

On the front end of the base member 10, there is shown arranged a dash 24 extending entirely across the vehicle and which may be formed with, or on which there may be mounted in any desired manner, as by the integral brackets 25, an instrument board 26. The dash 24 and the brackets 25 may also if desired support a gasoline tank 27 having a gravity connection to the engine carburetor and provided with a filler cap 28 accessible by raising the cowl ventilator 29 just back of the removable engine hood 30.

The dash 24 may be formed with a recess 31 adapted to be spanned by a steel stamping 32 seated and suitably secured therein and carrying a bearing 33, preferably of rubber, which forms a swivel mounting or pivot for a cylindrical boss 34 formed on the rear end of the power or engine-transmission unit, preferably in line with the axis of rotation of the engine crankshaft.

The above-mentioned power or engine-transmission unit preferably includes an engine 35, on the crank case of which the boss 34 is formed, and a separately formed transmission-clutch housing 36 rigidly bolted or otherwise secured to the engine 35, and which is formed at its front end with a cylindrical boss or pivot 37 also in line with the crank shaft axis and therefore coaxial with respect to the boss 34.

As best appears in Figures 2, 3, and 15, the boss 37 is swiveled or pivoted in a bearing 38 preferably of rubber, seated in a cylindrical extension 39 of an engine bracket or pyramidal supporting frame having four diverging arms 40 bolted rigidly to the four corners of the dash 24. The bracket or frame 39—40 may be provided with lugs 41 or other suitable supporting means for the radiator 42, which may be connected as shown in Figure 3 at its upper end to the dash 24 by suitable struts or tie rods 43. The radiator 42 may be housed within a suitable shell 44 also supported from the lugs 41 and giving a streamlined appearance as shown in Figure 1.

In order to facilitate the illustration of the positions of the parts, the dash 24 is shown in position on the base 10 in Figure 15, and separate from the engine bracket or support 39—40. It will be understood that in the actual assembly of the parts the dash 24 with the parts which it carries, including the stamping 32 carrying the bearing 33, form a part of the front or engine unit and are rigidly bolted to the base or arms of the pyramidal supporting bracket 40 to form a separately-assembled unit with the engine-transmission or power unit and the front wheels and their associated parts.

This unit is intended to be seated on the front end of the base 10, with the dash 24 bolted or otherwise rigidly secured thereto in the position shown in Figure 15, in order to fasten the front and rear units together to complete the final assembly of the vehicle. It is of course possible to separate the engine bracket or support 40 from the dash 24 without removing the latter from the base 10, as shown in Figure 15, but it is not intended that the parts shall be assembled or disassembled in this manner, but that the front or engine unit with its wheels and their driving mechanism shall instead form a self-contained unit which has merely to be bolted to or unbolted from the rear unit to assemble or disassemble the car.

By the above arrangement an exceptionally strong but light chassis is secured. All the chassis strains center themselves finally in the very strong and rigid transverse reinforced dash 24 or its equivalent, which may be regarded as a transverse bridge or key member from which the weight is transmitted to the wheels by what are in effect novel front and rear cantilever systems. The front cantilever system includes the lower members 40, which are in compression, and the upper members 40, which are in tension. The rear cantilever system is built into the base 10, the lower portion of which is in compression and the upper portion in tension. The tension portions of both systems are sufficiently rigid, however, to resist compressive thrusts due to shocks and the like, which might tend to shift the dash 24. The whole, however, gives an unusually strong chassis with a greatly reduced weight.

It will be seen that with the engine and its associated transmission mechanism mounted as described above, the engine swivels freely with respect to the body of the car and with respect to the base 10, which can be regarded as a substitute for the usual chassis frame, and therefore cannot possibly transmit to the body any vibrations due to the reaction from the torque of the engine pistons acting periodically on the engine crank shaft in driving the vehicle. It will be appreciated that the impulses of the successively effective pistons on the engine crank shaft are balanced by corresponding reactions on the engine cylinder and crank case assembly. Normally these reactions are transmitted directly to the vehicle frame, and while constructions have recently been adopted in automotive construction for cushioning these reactions against the chassis frame, their effect is thereby only minimized and not eliminated. I propose to eliminate the effects of these vibrations entirely, so far as their effect on the vehicle body, and therefore on the passengers, is concerned, by transmitting them directly to the front wheels without any reaction whatever on the vehicle body, or on the base 10, which corresponds to the usual chassis frame.

The above described mounting of the power unit, which permits it to swivel freely about the axis of the crank shaft on the parts 34 and 37 which are seated respectively in the bearings 33 and 38, is an important feature in securing the desired elimination of the torque reactions. Another important feature in securing this desired result, and at the same time securing very important advantages in providing independent springing of the two front wheels, and preferably in a manner facilitating the driving of the front wheels, consists in the supporting of the front end of the vehicle, through the bearing 38 and the boss 37, upon the transmission housing 36 or other part of the power unit, on opposite sides of which are mounted novel axle members carrying the front road wheels 46.

These wheels and their mounts in themselves embody features of novelty which are discussed below in describing Figure 12, but in connection with the engine mounting the interesting feature is the mounting of the wheels on upper and lower supporting or axle members 47 and 48, one of which members (shown as the lower member 48) is Y-shaped in plan view as appears in Figure 6, with its stem carrying the lower end of the wheel spindle and with the two arms engaging the bottom of the transmission housing 36. The inner end of the axle member 47, and the inner ends of the two arms of the member 48, are preferably H-shaped in cross-section as shown in Figure 11, and seated between compressed blocks of rubber or the like 49, the end of each axle member and the corresponding rubber block assembly being seated in a socket formed in the transmission housing 36 and completed by a cap 50 pulled up tight to compress the rubber blocks by bolts or the like 51.

It will be appreciated that the very long lever arm formed by the axle members 47 and 48 decreases the amplitude of movement at the inner ends of these arms, which are thus yieldably connected to the transmission case 36, to such an extent that the very small movement which is permitted by the highly compressed rubber blocks is sufficient to allow an amplitude of movement to the outer ends of the axles which, taken with the use of very large section low-pressure tires of the type known as super-balloon tires, gives adequate springing for the vehicle with a very simple structure which does not require any lubrication and which has nothing to get out of order. The rubber mounting above described also has some of the characteristics of a shock absorber, sufficient for most purposes in the case of an extremely light vehicle such as is being described, in that the resilience of the compressed rubber resists sudden movements of the axles but with a return reaction or rebound which is much slower and less violent.

I prefer to form the axle members 47 and 48 by welding together, face to face, stamped steel parts of single channel section as shown in Figure 7, or double channel section as shown in Figure 8. This facilitates the formation of the seats for the rubber blocks 49 shown in Figures 10 and 11. It will be noted by comparison of Figures 10 and 11 that the blocks 49 not only cushion the axles against upward and downward movement at their outer ends, which produces a twisting of the inner ends in the rubber seats, but also cushions them against lengthwise movement which is also resisted by resilient distortion of the blocks 49. To this end the seats for the blocks are H-shaped in section lengthwise of the axles as shown in Figure 10, as well as crosswise as shown in Figure 11, and if desired suitable buffers or rubber blocks 52 may also be seated between the ends of the axles and the ends of the sockets in housing 36 to prevent any possibility of a rigid metal-to-metal contact, in the case of a wheel striking a curb or other obstruction.

It will be noted that the forking of the member 48 to provide two independently mounted arms gives a three point suspension for each wheel, and that each of the three arms forming that suspension has a yielding resilient movement independently of the other two arms, and that the movement of each wheel is entirely independent of the movement of the other wheels.

Since the wheels have what may be regarded as parallelogram-linkage mountings, combined with center-point steering, it will also be noted that even in case of a blow-out of the tire there is substantially no tendency to react on the steering gear and cause the car to swerve. This is because the swiveling axis of the wheel remains substantially parallel to itself even in case of such a substantial drop as is caused by a blow-out, and also remains in the load plane of the wheel. The wheel, therefore, even with the tire gone flat, is substantially neutral as to its reaction on the steering gear. This is an important safety feature in a car having unusually large-section tires and yet intended to be driven at unusually high speeds.

It will also be appreciated from the foregoing description that the vibrations produced by the reaction of the driving impulses on the power unit are yieldingly transmitted through the axle members 47 and 48 directly to the wheels 46, which themselves provide additional cushioning of these vibrations, since these axle members and the wheels form the sole means preventing the turning of the power unit about the axis of its supports 34 and 37. I regard this combination, which at the same time cushions these vibrations and transmits them directly to the wheels without any reaction on the vehicle body, by means which at the same time serves as an engine support and as an individual spring suspension for the wheels, and which also provides a self-contained engine-front-drive unit adapted to be assembled as such and then bolted or otherwise attached as an entirety to a rear unit, as forming a substantial contribution which is entirely new as a combination as well as in many of its parts and sub-combinations.

The above-described yieldingly-mounted supporting arms or axle sections 47 and 48 are formed at their outer ends with horizontal eyes embracing pivot pins 53 connecting them to pairs of spaced lugs or forks 54 formed at the top and bottom of a novel support 55 bowed rearwardly to carry a vertical king pin 56, which swivels to the support 55 a knuckle 57. The latter may be formed with a tubular central portion in which are seated inner and outer ball bearings 58 and 59 in which is journalled a driving spindle 60.

The driving spindle 60 has an enlarged inner end forming the driven portion of a universal joint, and which is seated against the inner ball bearing 58, and is held in place by a collar 61 threaded or pinned or otherwise fixed thereon and engaging the outer ball bearing 59. The outer end of the driving spindle 60 is preferably conical, and has splined or keyed thereon a correspondingly-shaped socket in a spider or wheel member 62 held by an axle nut 63. The wheel member is preferably formed integrally with a brake drum within which are arranged the shoes 64 of a hydraulic brake, shown actuated by a wheel cylinder assembly 65 with which there communicates the usual hydraulic line 66. The shoes 64 may be mounted on stationary anchors or pivots 67 carried by a backing plate or other stationary support 68 bolted or otherwise secured to the knuckle 57.

The tire 69 of the wheel, shown as a large-section low-pressure super-balloon tire, may be mounted in a demountable rim 75 shown as being of the drop-center type, and which may have welded or otherwise secured thereto a flange 71 adapted to be detachably bolted to a cooperating flange 72 formed on the wheel and drum member 62. Preferably the member 62 has its outer face in the form of three or four angularly-spaced spokes so that complete access is afforded to the brake mechanism inside of the drum. The entire wheel and brake assembly may be closed in by a cover plate or fairing 73 engaging and suitably clipped or otherwise secured to the rim 70, thus providing, with the tire 69 and the fender 22, a structure which is almost completely streamlined. If preferred the cover or fairing 73 may be held by a screw 74 threaded into the end of the spindle 60.

It should be noted that the axis of the king pin 56 is substantially in the central plane of the wheel, as appears from Figure 12, thus giving "center-point" steering. It should also be noted that the effective length of the arm or axle 47 is slightly shorter than that of the arm or axle 48, so that the wheel does not move with its plane constantly vertical as would be the case if the arms 47 and 48 gave a parallelogram movement. Instead the movement of the upper part of the wheel is accentuated, it being given an additional arc of movement about the center of the lower pin 53, which additional movement is compounded with the normal upward and downward movement of the wheel to compensate for the movement which would otherwise take place at the bottom of the tire in a direction toward and from the vehicle and which might give an undue tendency to wear the tire against the road surface. This compound movement maintains the position of the center point 75, which is the point momentarily at the bottom of the tire and in contact with the road, exactly in a straight vertical line instead of an arc. The slight additional movement of the top of the wheel toward and from the vehicle is not objectionable, and this arrangement eliminates transverse movement of the bottom of the tire, and therefore minimizes tire wear due to the deflections of the wheels with respect to the vehicle body.

The inner end of the drive spindle 60, which is keyed to and which drives and supports the wheel, is formed with a plurality of fingers having cam slots 76 formed therein, which cooperate with corresponding cam slots 77 in driving fingers formed on the end of a live or driving axle shaft 78 to receive driving balls 79 to form a universal joint of the "Weiss" type. In this type of joint relative axial movements of separation and approach of the axle shafts 60 and 78 is permitted by movements of the driving balls 79 in the cooperating cam slots 76 and 77, without changing the effectiveness of the drive between the two axle sections. It is also a characteristic of this joint that in relative angular movements of the sections 60 and 78 with respect to each other, as for example in swiveling the wheel in steering around a corner, the rotary movement of the two shaft sections remains uniform and equal, as the driving balls 79 automatically center themselves to give the position having this effect. These characteristics of the "Weiss" type are well known, and are not herein claimed to be novel per se, or discussed in detail, but it should be noted that one of the features of my invention relates to the use in the described combination of a joint of this type which may be placed a very substantial distance from the axis of the king pin 56 without interfering with the swiveling movements of the wheel in steering, and without giving any unevenness in the driving torque acting on the wheel.

The above-described driving axle shaft assembly 60—78, and the connecting joint, are shown housed in a tubular jointed housing including parts 80 and 81 having interfitting spherical portions which maintain a tight joint regardless of the swiveling movements of the wheel in steering.

The inner end of the tubular housing 81 is also formed with a spherical portion (provided if desired with a felt packing or the like 82), movably fitting over a corresponding spherical housing 83 shown as having joined thereto a flanged base 84 urged axially outward by a compressed coil spring 85 confined between the base 84 and the adjacent face of the transmission housing 36 (Figure 18). Within the movable housing joint thus formed is arranged another universal joint of the "Weiss" type having driving balls 86, and drivably connecting to the live axle or driving shaft 78 a short drive shaft or axle section 87 rotatably mounted in a ball bearing 88 carried by the transmission housing 36.

The shaft section 87 is keyed to a differential pinion 89 journalled in a tubular boss 90 forming part of a differential pinion carrier 91, the bosses 90 on opposite sides of the differential being journalled in tapering roller bearings 92 mounted in seats formed in the transmission housing 36, and adjustably held by an externally threaded nut 93 adapted to be locked in adjusted position by a key or the like 94. While this arrangement is only shown on one side of Figure 18, it will be appreciated that the same construction is to be found on the left side driving the axle 78 on that side.

The differential pinions 89 mesh in the usual way with driving or side pinions 95 (Figures 17 and 18), which are freely rotatable on a transverse supporting shaft 96 carried by the differential pinion carrier 91. The carrier in turn has bolted or otherwise secured thereto a worm gear 97, or the equivalent, meshing with a driving worm 98 shown integrally formed on a hollow shaft 99 extending longitudinally of the transmission housing 36, and substantially in line with the engine crank-shaft, and supported by tapered roller bearings 100 carried by the housing 36 just in front of and just behind the differential. The bottom of the casing 36 may be provided with an opening having a detachable cover 101 which can be removed to facilitate adjustment of the differential.

The change-speed transmission selected for illustration is of the progressive sliding-gear type, and as best appears in Figure 17 is arranged in front of the above-described differential. While a change-speed gear or transmission of other types can be used if desired, I now prefer the construction shown, in which the drive is from a driven shaft 102 extending forwardly from the clutch described below and which connects it to the engine crank shaft, and which is supported for the greater part of its length in the above-mentioned tubular shaft 99, and which has its extreme forward end supported in a ball bearing or the like 103 arranged in the front end of the housing 36.

The front end of this shaft is provided with a one-way clutch member 104 accessible through the open end of the boss 37, for inter-engagement with a hand crank for use in case of a failure of the electric starting mechanism. The front end of the shaft 102 just beyond the end of the shaft 99 also has mounted thereon and keyed thereto a driving pinion 105 meshing with a larger pinion 106, which larger pinion forms part of a gear cluster 107 rotatably mounted on a countershaft 108 carried by the housing 36. The cluster 107 is also formed with a low speed gear 109 and with a reverse gear 110 driving a reverse idler gear 111.

Splined on the forward end of the shaft 99 is a shiftable sliding driven gear 112 operated by a shifter fork 114, on a lengthwise-movable shifter rod 115 actuated in any suitable manner from the dash. The rear face of the pinion 105 and the front face of the sliding gear 112 are formed in the usual manner with inter-engaging clutch faces in the form of short splines or teeth formed externally on the pinion 105 and internally on the gear 112.

Shifting the rod 115 rearwardly from its extreme forward position, in which the gear 112 would be shown at the dotted line position 112d in Figure 17, progressively gives in succession the following positions: (1) 112d, or direct drive; (2) 112 full line, or neutral position; (3) 112L, or low gear position; (4) 112n, another neutral position; and (5) 112r, or reverse drive; in which last position gear 112 is in mesh with the reverse idler gear 111.

The above arrangement gives the "spring" of the entire length of the shaft 102 and of the shaft 99 between the driving clutch and the driving engagement with the differential, thus to a great extent eliminating fluctuating impulses of power acting on the drive axles 87 and therefore on the wheels.

I prefer to arrange the clutch between the differential and the engine, and it is herein shown as arranged in a stamped housing 120 bolted to the front face of an engine fly wheel 121, which in turn is bolted or secured in any other desired manner to the front flange 122 of the engine crank shaft. The flywheel is provided with a ball bearing 123 at its center, and receives and supports the rear end of the above-described driven shaft 102. I prefer to form the fly-wheel 121 with a beveled periphery as shown in Figures 17 and 22, for frictional engagement with a correspondingly-shaped friction driving pinion 124, carried by the armature of a starting motor and movable in the plane of the fly wheel into and out of frictional engagement therewith by the operating torque of the starting motor which drives it, in the manner more fully described in Bijur Reissue Patent No. 15,403.

The illustrated clutch is of the single plate type and includes a stamped steel driven plate 125, faced on its opposite sides with friction material such as the usual clutch facing, and which is adapted to be clamped against the front face of the fly-wheel 121 by the operation of a clutch thrust ring 126. The latter is normally urged in a direction to engage the clutch, by a series of compressed coil springs 127 arranged between the front face of the ring 126 and supporting bosses 128 drawn in the stamping 120. The thrust ring 126 is keyed at its periphery to teeth or the like 129 secured in any desired manner to the stamping 120 which is bolted to the fly wheel 121, and therefore turns with the fly wheel, as do the springs 127.

The clutch plate 125 is formed with forwardly projecting lugs 130 which are riveted or otherwise secured thereto, or which may be stamped integrally therefrom, and which engage a series of compressed coil springs 131 which are confined at their opposite ends by fingers 132 formed on a hub 133 which is splined on the rear end of the shaft 102. The clutch plate 125 and the hub 133 are yieldingly held together axially by springs 134 confined between the heads of pins 135 and the clutch plate 125, the pins 135 passing through the clutch plate 125 and through relatively large clearance openings in discs or washers 136, which may be of friction material, and through openings in the flange on the hub 133. The pins are provided with suitable nuts or the like 137 forming heads on their opposite ends, preferably formed with spherical bases seated in corresponding sockets in the flange on the hub 133. The above-described arrangement tends through the relative shifting of the parts, against the yielding resistance of the springs 134 and 131 and the frictional gripping of the rings 136, to iron out any unevenness in the angular movement of the crank shaft of the engine as it is transmitted to the driven shaft 102.

The springs 127 are compressed to throw out the clutch by rocking rearwardly the inner ends of a series of clutch throwout levers 138, yieldingly held by light springs 139 in engagement with the inner edges of openings 140 in the stamping 120, which edges form the fulcrums for the clutch throw-out levers. The outer ends of these levers are formed with notches receiving corresponding projections in the bases of nuts 141, adjustably threaded on the forward ends of pins 142 having heads seated in recesses on the forward face of the clutch thrust ring 126. Springs 143 sleeved on the pins 142 are confined between the forward face of the ring 126, and washer 144 engaging rounded projections on the levers 138, and cooperating with the springs 139 to keep all of the parts under tension and avoid any rattling, in any position of adjustment of the adjustment nuts 141. The levers 138 may be operated to throw out the clutch by a suitable throw-out bearing 145 actuated in the usual manner by connections from the clutch pedal (not shown).

The roller bearings 100 for the hollow shaft 99, and the position of the worm 98 with respect to the worm gear 97, are determined by an adjustable nut 147 threaded into a cross-web in the casing 36 which carries one of the bearings 100, and which holds the assembly of the two bearings and the shaft in a position determined by a fixed bracket 146. This bracket is secured to another web formed in the housing 46 and is formed with a bearing or boss through which the right end of the shaft 102 passes, this boss serving as a pilot or guide for the clutch throw-out bearing 145. The clutch member 104 for the starting crank may, if desired, be housed in by a suitable stamped steel cap 148 removably threaded into the front wall of the housing 46.

The rear end of the base or chassis frame substitute 10 is strengthened by means such as two tubular parallel torque-resisting members 149 secured at their ends to the sides of the base 10. I prefer to mount across the top of these reinforcing members 149 a clamp member such as a forging 150, the form of which is shown in Figures 25 and 26. This is formed at its ends to embrace the upper portions of the reinforcing members 149, and is formed at its center with a socket 152 similar to the socket receiving the front axle section 47. The clamp members 150 are held in place by vertical clamp bolts 151 engaging bottom clamp members or caps 152, each of which is formed with a socket similar to the sockets holding the inner ends of the axle member 48.

The three sockets so formed are completed by caps 153 similar to the caps 50, and hold compressed blocks of rubber embracing the axle sections in exactly the same manner as the sockets for the front axle sections. In this case the blocks of rubber hold upper straight axle sections 154, and the inner ends of the arms of Y-shaped axle sections 155, corresponding respectively to the upper and lower front axle sections 47 and 48. These axle sections, in the same manner as described for the front sections, have their outer ends pivoted to vertical members on which the rear road wheels 156 are rotatably mounted, but since the rear wheels are not swiveled in steering the horizontal parts on which the wheels rotate may be made integral with the vertical parts pivoted to the axle sections, instead of being swiveled thereto by king-pins as in the case of the front wheels.

Figures 27 to 32 inclusive show several forms of wheels which may be adapted for use either for the front or rear wheels of the above-described vehicle. The wheel shown in Figure 27 includes a drop-center rim 157 having secured thereto an attaching flange 158, connected by attaching bolts 159 or the like detachably to a flange 160, shown as integrally formed on a brake drum 161 within which are arranged the shoes 162 and the operating hydraulic cylinder 163' of a hydraulic brake. The drum 161 is integral with a series of spaced spokes 162 extending outwardly from a central hub 163 having a tapered bore, which is keyed to and clamped in place on the tapered end of a spindle or driving axle 164 by means such as a spindle nut 165, and covered over and streamlined as before explained by a cover 156 engaging and secured in any desired manner to the outer edge of the rim 157. The spindle 164 is shown rotatably mounted in ball bearings 167 and 168 seated in the inner and outer ends of a tubular section 169, formed on a knuckle 170 which carries the backing plate 171 of the brake, and which is connected by the above-described king-pin or the like to a vertical member 172 formed at its upper and lower ends with eyes adapted to be connected by horizontal longitudinally-extended pivots to the outer ends of the axle sections 47 and 48, or 154 and 155, as the case may be.

The wheel shown in Figure 28 includes a drop center rim 173 having an attaching flange 174 detachably bolted to a flange 175 formed on a drum 176 shown as integral with spokes 177 covered by a fairing or cover plate 178. In this case, however, the spokes 177 are integral with a center rotatable hub 179 closed by a hub cap 180 and rotatably mounted on ball bearings 181 and 182 mounted on a stationary spindle 183, on which they are held by a castellated spindle nut 184. The spindle 183 is shown integral with a vertically extending carrier member 185 formed with upper and lower eyes for attachment to the axle sections as already described. Since there is no vertical king-pin in this assembly, it is especially well adapted for use as one of the rear wheels.

Figure 29 shows a drop-center rim 186 having an attaching flange 187 seated directly in a rabbeted portion of a brake drum 188, being detachably secured thereto by suitable bolts or machine screws or other fastenings 189. The drum 188 in this case is integral with inclined spokes 190 terminating in a center hub or sleeve 191, to the edge of which the fairing or cover 192 is shown attached by a small machine screw 193, and which forms a recess receiving a spindle nut 194 clamping the hub 191 on the conical end of a spindle 195. Spindle 195 is rotatably mounted in an outer ball bearing 196 and an inner roller bearing 197.

The spindle 195 may have a separate part 198 gripped on its inner end and formed in the case of a front wheel in any desired manner as part of a universal joint, or in the case of the rear wheel merely as a thrust part holding the spindle in place. Bearings 196 and 197 are arranged in a tubular axle member or carrier 199 carrying the brake backing plate 200, and formed at its upper and lower parts with eyes for pivotal attachment to the axle sections when the assembly is being used, as is the case in the form illustrated, for one of the rear wheels.

The arrangement shown in Figure 30 is intended for use when, instead of the two axle sections shown, it is intended to use only one Y-shaped section 201 mounted in the same manner as the section 48, but terminating at its outer end in a downwardly-extending integral spindle 202 which forms in effect a king-pin on which is swiveled a knuckle or wheel-supporting member 203, carrying the brake backing plate 204 and containing inner and outer ball bearings 205 and 206 in which is journalled a spindle 207. On the conical outer end of the spindle there is clamped, by a spindle nut 208, the hub 209 of a wheel member, covered by a fairing 210 and having spokes 211 formed integrally with the brake drum 212. The brake drum has an attaching flange 213 to which is detachably bolted or otherwise secured an attaching flange 214 formed on a drop center rim 215.

When this assembly is to be used as a rear wheel, the spindle 207 may be short enough to be received in the tubular housing 203 and provided at its inner end with a second spindle nut 216 holding the bearing 205, while the end of the axle housing or knuckle 203 may be closed by a cap 217 threaded thereinto, and formed with an inwardly extending arm 218 and adapted to be pivotally connected to a radius rod extending from the base or chassis frame 10 and holding the wheel assembly from swiveling movement about the axis of the king-pin 202.

The wheel shown in Figure 32 includes a drop center rim 219 having an attaching flange 220, detachably secured by fastenings 221 directly to a rabbeted portion of a brake drum 222, which is integral with spokes 223 extending outwardly from a central tubular hub 224. A fairing or cover 225 is secured to the hub by means such as a machine screw or other fastening 226. The hub 224 contains inner and outer ball bearings 227 and 228, rotatably mounted on a stationary spindle 229 having a spindle nut 230 which holds the bearing 228. The spindle 229 is integral with a knuckle member 231, carrying the brake backing plate 232 and having a steering arm 233 secured thereto, and having rigidly attached thereto a sleeve 234 adapted to be pivotally mounted on the above-described king-pin for swiveling movement of the wheel. This form of wheel is suitable for use as a front wheel when the invention is being embodied in a vehicle having the conventional rear drive.

The hydraulic brakes which have been described above may be operated by a master cylinder 235 of conventional construction, arranged inside of the box-section base 10 and operated by a brake pedal 236 which extends upwardly through an opening in the inclined floor board portion of the dash 24, which has previously been described. The master cylinder 235 is connected with the wheel cylinders at the brakes by suitable conduits or fluid lines 237, which are arranged as far as possible inside of the box-section base 10. The connections to the front brakes include a flexible portion 238 extending to the pivotally supported engine-transmission power unit, whence it is connected by a conduit 239 to conduits 240 extending along the right and left axle sections 48 to the brakes. There is the usual flexible section 241 forming part of the hydraulic line adjacent each of the four wheels.

A steering gear 242, which may be of any design, is shown as arranged to operate a transverse steering rod 243 mounted for lengthwise movement in the dash 24. The dash also carries the steering gear 242. The steering rod 243 is connected at its opposite ends, by means such as bell crank levers 244 mounted on the dash 24, to drag links 245 extending forwardly on opposite sides of the power unit and connected to steering arms 246, which are integral with or secured to the knuckle members 55 and are therefore operable to swivel the two front wheels in the usual manner.

It is believed that the operation of the vehicle will be apparent from the explanation which has been given in connection with the description of the different parts of the mechanism. Attention is called to the case with which a vehicle of this construction and arrangement can be stream-lined as shown in Figure 1, to the extreme simplicity of the mechanism which in turn tends toward lower costs, to the elimination of many of the conventional parts of an automobile chassis and consequent reduction in weight, and to the elimination of engine vibration, and to the fact that the vehicle is pulled along by a front wheel drive instead of pushed along by a rear wheel drive, also to the use of light stamped steel constructions which serves to minimize the weight.

The extremely light weight of the vehicle in turn makes for an unusually rapid acceleration with an engine of similar power and, together with the effective stream-lining, also makes for high speeds. At the same time the low-pressure type of tires used not only complements the very simple type of spring suspension, but also gives a very considerable amount of tire surface in engagement with the road, so that the engine is effective in accelerating the vehicle and the brakes are effective in decelerating the vehicle to a degree ordinarily associated with vehicles having far higher weights.

By comparing Figures 2 and 3, it will be noted that the vehicle in effect is in two sections, a rear section including the reinforced base and a front section consisting of the power-plant and the rigid tapering cantilever arms or supports 40 on its opposite sides and carrying its front bearing, these two sections being connected by a transverse bridge formed by the dash.

While one illustrative vehicle has been described in great detail, it is not my intention to limit the scope of the invention to that particular vehicle, or otherwise than by the terms of the appended claims. This application is a division of my application No. 651,821, filed January 14, 1933.

I claim:

1. A motor vehicle comprising a rear section having road wheels and a base adapted to support a body and a front section having a transverse dash and a support carried by and projecting forwardly from said dash, said dash being secured to the forward end of said base to assemble the complete vehicle and said support and said dash having alined respectively front and rear bearings in the longitudinal center line of the vehicle, a power unit mounted at its front and rear ends in said bearings and angularly movable therein without restriction from said support or from said rear section about the axis of said bearings and arranged with its crankshaft axis substantially coincident with the axis of said bearings, upper and lower sets of right and left axle sections yieldingly connected to said power unit on opposite sides thereof and directly taking the reaction torque therefrom and forming the sole means resisting angular movement of said unit in said bearings, supports swiveled at the outer ends of the right and left sets of axle sections respectively and having front road wheels rotatably mounted thereon, and live driving axles driven by said power unit and arranged between the upper and lower axle sections and arranged to drive said wheels.

2. A motor vehicle comprising one section having road wheels and a base and another section having a transverse portion and a support carried by and projecting from said portion, said portion being secured to the end of said base to assemble the complete vehicle, and said support and said portion having alined bearings in the longitudinal center line of the vehicle, a power unit mounted at its front and rear ends in said bearings and angularly movable therein without restriction from said support or from said first section about the axis of said bearings and arranged with its crankshaft axis substantially coincident with the axis of said bearings, upper and lower sets of right and left sections yieldingly connected to said power unit on opposite sides thereof and directly taking the reaction torque therefrom and forming the sole means resisting angular movement of said unit in said bearings, supports at the outer ends of the right and left sets of axle sections respectively and having road wheels rotatably mounted thereon, and live driving axles driven by said power unit and arranged between the upper and lower axle sections and arranged to drive said wheels.

3. A motor vehicle having front and rear sections having respectively front and rear road wheels and rigidly connected in a transverse joint approximating the dash and with the front section comprising a transverse support at its rear end and to which the rear section is connected, a supporting structure carried thereby and projecting forwardly therefrom and with the support and said structure provided with alined rear and front bearings respectively, said bearings having their axis in the longitudinal central plane of the vehicle, a power unit having a swivel mounting in said bearings and movable freely angularly therein, means yieldingly supporting said front road wheels independently of each other from said power unit, and means drivably connecting said unit with said front wheels.

4. A motor vehicle having front and rear sections having respectively front and rear road wheels, and with the front section comprising front and rear supports provided with alined front and rear bearings respectively, the rear section being connected to said rear support, said bearings having their axis in the longitudinal central plane of the vehicle, a power unit having a swivel mounting in said bearings and movable freely angularly therein, means yieldingly supporting said front road wheels independently of each other from said power unit, and means drivably connecting said unit with said front wheels.

5. A motor vehicle having front and rear sections having respectively front and rear road wheels, and with the front section comprising front and rear supports provided with alined front and rear bearings respectively, the rear section being connected to said rear support, a power unit having a swivel mounting in said bearings and movable freely angularly therein, means yieldingly supporting said front road wheels independently of each other from said power unit, and means drivably connecting said unit with said front wheels.

6. A motor vehicle having a transverse dash and having front and rear sections having front and rear wheels and rigidly joined together at said dash and one of which sections has a power unit pivotally mounted therein for movement freely about an axis extending longitudinally of the vehicle, a bearing carried by the dash in which one end of the power unit is pivoted, means for yieldingly connecting the wheels of said one section yieldingly directly with said unit in such a manner that said unit forms the supporting connection between its section and the corresponding wheels, and means for drivably connecting said unit and said corresponding wheels.

7. A vehicle having a transverse portion having a bearing, a structure comprising arms rigidly secured to said portion and carrying another bearing spaced from and in line with the first bearing, an engine arranged between said arms and pivotally mounted in said bearings, and a radiator for the engine which is mounted on said structure.

8. A vehicle having a transverse portion having a bearing, a generally converging structure having its base secured to said portion and carrying at its apex another bearing spaced from and in line with the first bearing, an engine pivotally mounted in said bearings, and a radiator for the engine which is mounted on said structure near said apex.

9. A vehicle having a transverse dash, a framework comprising spaced arms secured to and supported by and projecting a considerable distance forwardly of the dash, and a radiator mounted on the front of said framework and paralleling the dash, said dash and said arms and said radiator defining a central unobstructed space adapted to receive a power unit.

10. An engine support having a bearing portion for pivotally receiving an engine part and having a plurality of arms diverging from and supporting said portion and adapted to receive the engine between them and means for supporting said arms.

11. A vehicle having a power unit mounted for movement about an axis extending longitudinally of the vehicle, road wheels and independent axle sections yieldingly connected at their inner ends to the opposite sides of said power unit and extending transversely outwardly from the power unit and means connecting the outer ends of said axle sections to said wheels to support the power unit on the wheels.

12. A vehicle power plant having sockets in its opposite sides, axle sections generally perpendicular to the center line of the power plant and extending into said sockets, and rubber blocks in said sockets yieldingly holding the ends of said sections.

13. A vehicle power plant including an engine and a transmission driven by the engine and a differential between the engine and transmission and driven by the transmission, all arranged in one rigid unit having sockets in its sides opposite the differential and between the engine and the transmission, rigid axle sections yieldingly seated in said sockets and rotatably carrying road wheels, and driving shafts connecting the differential with said wheels.

14. A vehicle power plant including an engine and a transmission driven by the engine and a differential between the engine and transmission and driven by the transmission, all arranged in one rigid unit having sockets in its sides opposite the differential and between the engine and the transmission, and axle sections yieldingly mounted in said sockets and rotatably carrying road wheels driven by said differential.

15. A vehicle power plant including an engine and a transmission driven by the engine, both arranged in one rigid unit having sockets in its sides between the engine and the transmission, rigid axle sections seated in said sockets, and rubber blocks in said sockets carrying the ends of said sections.

16. A power unit having three sockets in each of its opposite sides and two axle sections on each side yieldingly mounted therein, one being Y-shaped in horizontal plan and having its two arms seated in two of the sockets.

17. A power unit having sockets in its sides and axle sections yieldingly mounted therein, at least one being Y-shaped in horizontal plan and having its two arms seated in two of the sockets.

18. A power unit having sockets in its sides and axle sections yieldingly mounted therein, at least one being Y-shaped in horizontal plan and having its two arms seated in two of the sockets, and rubber blocks in said sockets and holding said sections.

19. A power unit having a socket provided therein, an axle section having its end projecting into the socket, rubber blocks in the socket between which said end is held, and a rubber block in the socket opposite the end of the section.

20. A power unit having a socket provided therein, an axle section having its end projecting into the socket, and rubber blocks in the socket between which said end is held.

21. A vehicle having pairs of upper and lower rigid axle sections on opposite sides of its central longitudinal plane, rubber blocks for yieldingly mounting the ends of said sections nearest said plane, and road wheels rotatably carried by the outer ends of said sections.

22. A vehicle having pairs of upper and lower rigid axle sections on opposite sides of its central longitudinal plane, independent rubber mountings for the ends of said sections nearest said plane, vertical members pivoted at their upper and lower ends to said sections, and parts swivelled to said vertical members on vertical axes and rotatably carrying road wheels.

23. A vehicle having pairs of upper and lower rigid axle sections on opposite sides of its central longitudinal plane, independent rubber mountings for the ends of said sections nearest said plane, vertical members having pairs of arms at their upper and lower ends between each pair of which one of said sections is pivoted at its end and parts swivelled to said vertical members on vertical axes and rotatably carrying road wheels.

24. A vehicle having pairs of upper and lower rigid axle sections on opposite sides of its central longitudinal plane, yielding means for mounting the ends of said sections nearest said plane, vertical members pivoted at their upper and lower ends to said sections, parts formed with central horizontal tubular portions having antifriction bearings therein and which parts are swivelled on vertical axes to said members, and wheels having spindles rotatably mounted in said bearings.

25. A vehicle having pairs of upper and lower rigid axle sections on opposite sides of its central longitudinal plane, yielding means for mounting the ends of said sections nearest said plane, vertical members pivoted at their upper and lower ends to said sections, parts formed with central horizontal tubular portions and which parts are swivelled on vertical axes to said members, and wheels having spindles rotatably journalled in said tubular portions.

26. A power unit comprising a differential and a housing therefor having bearings rotatably supporting the opposite sides of the differential, short shafts driven by the differential and passing through said bearings and to the exterior of said housing and having live axle shafts arranged end to end with respect thereto and which are connected thereto by universal joints, antifriction bearings carried by said housing and rotatably supporting said short shafts where they pass through the housing, a housing for the end of each short shaft and the adjacent universal joint and covering the corresponding bearing, a tubular housing for each live axle shaft universally engaging the first housing, and a spring confined between each of the first housings and the housing of the differential and urging the shaft housings outward axially of the shafts.

27. A power unit comprising a differential and a housing therefor having bearings rotatably supporting the opposite sides of the differential, short shafts driven by the differential and passing through said bearings and to the exterior of said housing and having live axle shafts arranged end to end with respect thereto and which are connected thereto by universal joints, anti-friction bearings carried by said housing and rotatably supporting said short shafts where they pass through the housing, a housing for the end of each short shaft and the adjacent universal joint and covering the corresponding bearing, a tubular housing for each live axle shaft universally engaging the first housing, said housing being formed with half sockets and detachable caps secured thereto to form sockets on opposite sides of the power unit adjacent said bearings, rigid axle sections having their ends extending into said sockets, and yielding means in said sockets engaging said ends.

28. A power unit comprising a differential and a housing therefor and laterally-extending shafts driven thereby and extending through the sides thereof, said housing having sockets in its sides spaced about said shafts, axle sections having their ends extending into said sockets, and yielding means in said sockets engaging the ends of the axle sections.

29. A unit comprising a support having a socket, an axle section having its end generally H shaped in both vertical transverse and vertical longitudinal section and having said end arranged in said socket, such formation of said end forming upper and lower seats in said end, and rubber blocks arranged in said seats and compressed in said socket.

30. A unit comprising a support having a socket, an axle section having its end generally H shaped in both vertical transverse and vertical longitudinal section and having said end arranged in said socket, such formation of said end forming upper and lower seats in said end, rubber blocks arranged in said seats and compressed in said socket, and a third rubber block arranged in the socket across the end of the axle section.

31. A vehicle having four independently movable sets of rigid axle sections each set including upper and lower rigid axle elements yieldingly mounted at their inner ends, a wheel provided with a brake carried by the outer ends of each of said sets of sections, and hydraulic means for operating the brakes including fluid lines carried by one element of each of said sets and extending from the inner to the outer end of said one element.

32. An automobile chassis comprising a flat-bottomed rear section having a vertical dash at its front end and with supporting means projecting forwardly from the dash and having an engine mounted thereon.

33. An automobile chassis comprising a rear section having a vertical dash at its front end and with supporting means projecting forwardly from the dash and having an engine mounted thereon, and front road wheels driven by and supporting said engine and through the engine supporting the front end of the chassis.

34. An automobile chassis having a vertical dash provided on its front side with two bearings spaced longitudinally of the chassis and supporting an engine.

35. A vehicle having a vertical dash and forwardly-projecting arms mounted on the front of the dash, road wheels, and a power unit mounted at one end on the dash and at the other end on the arms and independent axle sections yieldingly connecting the power unit to said wheels.

36. A vehicle having a vertical dash and forwardly-projecting arms mounted on the front of the dash and supporting the weight of the vehicle at its front end and which are spaced apart and an engine arranged between said arms and supported at one end by said arms and at its other end by the dash and wheel suspension devices directly connected to said engine.

37. A rigid power unit comprising an engine and a clutch and a transmission and a differential, and having coaxial cylindrical supporting members at its opposite ends adapted to be mounted in bearings, and one of which is formed to afford axial access to a starting crank adapted to crank the engine to start it.

38. A rigid power unit comprising an engine and a clutch and a transmission and a differential, and having coaxial cylindrical supporting members at its opposite ends adapted to be mounted in bearings, said engine having a shaft extending through said differential and transmission and having at its forward end a clutch within the front supporting member engageable with a crank inserted axially into said member.

39. A vehicle having an engine, a dash having means pivotally supporting the rear end of said engine and a structure rigidly secured to and projecting forwardly from said dash on opposite sides of the engine and having at its forward end means supporting the front end of the engine said pivotal supporting means being in axial alignment.

40. A vehicle having an engine, a dash having means supporting the rear end of said engine, and a structure rigidly secured to and projecting forwardly from said dash supporting the front end of the engine and a radiator also mounted on said engine supporting structure forwardly of said engine.

41. A chassis structure comprising a substantially rigid transversely-extending vertical dash, a base extending rearwardly therefrom, and right and left supports extending forwardly therefrom, said base and said supports forming in effect rear and front cantilever sections having parts in tension and other parts in compression, and adapted to support said structure on rear and front road wheels.

42. A chassis structure comprising a substantially rigid transversely-extending vertical dash, a base extending rearwardly therefrom, right and left supports extending forwardly therefrom, said base and said supports forming in effect rear and front cantilever sections having parts in tension and other parts in compression, and adapted to support said structure on rear and front road wheels, said supports and said dash having respectively front and rear engine mountings.

43. A chassis structure comprising a dash provided centrally with an engine support, and cantilever structures secured to opposite sides of the dash and projecting forwardly therefrom and having a second engine support alined with the first engine support and forming a front cantilever section supporting said dash.

44. A chassis structure comprising a dash having a central engine support, and generally tapering rigid structures extending from opposite sides of the dash and having their ends connected by a second engine support substantially alined with the first support.

45. A chassis structure comprising a box-section internally-braced base with a transverse dash at its forward end, and having cantilever structures projecting forwardly from opposite sides of said dash.

46. A vehicle body base comprising a box-section part having sides, a top, and a bottom and built up of welded steel stampings with reinforcing corrugations, and internally arranged longitudinally-extending channel section members reinforcing the sides of said base.

47. A chassis structure comprising a base portion including upper and lower sheet metal parts connected at their edges, a transverse dash secured to said base portion at the forward end thereof, and right and left supports extending forwardly from said dash, said supports and base portion adapted to be connected to road wheels to support said structure.

48. A chassis structure comprising a base portion built up of sheet metal parts, a transverse dash secured to said base portion at the forward end thereof, an engine support mounted substantially in the plane of the dash, arms extending forwardly of the dash and a second engine support carried by said arms at the front end thereof.

49. A chassis structure for a vehicle comprising a dash and generally tapering rigid structures supported solely by said dash extending from opposite sides thereof and having their ends connected, said structures adapted to support in part the weight of the vehicle.

50. A chassis structure comprising a transverse bridge formed centrally with an engine support, a base extending rearwardly therefrom and secured thereto to support said bridge at its forward end, and right and left cantilever arms secured to opposite sides of said bridge and extending forwardly therefrom and having an engine support substantially alined with the first engine support.

VICTOR W. KLIESRATH.